(12) United States Patent
Meaige et al.

(10) Patent No.: US 10,899,109 B2
(45) Date of Patent: Jan. 26, 2021

(54) MULTI-MATERIAL JOINT AND METHOD OF MAKING THEREOF

(71) Applicant: Honda Motor Co., Ltd., Tokyo (JP)

(72) Inventors: Benjamin J. Meaige, Powell, OH (US); Negar B. Gilsinger, Marysville, OH (US); Mariko Elaine Berg, Dublin, OH (US); Jared S. Kauffman, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 16/298,839

(22) Filed: Mar. 11, 2019

(65) Prior Publication Data

US 2020/0290313 A1 Sep. 17, 2020

(51) Int. Cl.
*B32B 7/12* (2006.01)
*B32B 7/08* (2019.01)
(Continued)

(52) U.S. Cl.
CPC .............. *B32B 7/12* (2013.01); *B32B 7/08* (2013.01); *B32B 15/012* (2013.01); *B29C 44/18* (2013.01);
(Continued)

(58) Field of Classification Search
CPC .. B62D 29/002; B62D 29/007; B62D 29/008; B62D 21/11; B62D 25/088; B62D 21/152; B32B 15/00; B32B 15/04; B32B 15/043; B32B 15/046; B32B 15/06; B32B 15/08; B32B 15/092; B32B 15/18; B32B 15/20; B32B 2255/26; B32B 2305/022; B32B 2307/56; B32B 7/08; B32B 7/12; B32B 15/012; B32B 2255/06; B32B 2307/714; B29C 44/18; B29C 65/00; B29C 65/48; B29C 65/483; B29C 65/4835; B29C 65/56; B29C 65/562; B29C 65/564; B29C 65/60; B29C 65/601; B29C 65/72; B29C 66/00; B29C 66/51; B29C 66/52; B29C 66/522; B29C 66/524; B29C 66/53; B29C 66/534;
(Continued)

(56) References Cited

U.S. PATENT DOCUMENTS 3,925,947 A 12/1975 Meyers et al.
5,739,184 A * 4/1998 Marbry ................. C08G 59/68
523/403
(Continued)

FOREIGN PATENT DOCUMENTS

CN 102181106 A 9/2011
CN 102477271 A 5/2012
(Continued)

*Primary Examiner* — Philip C Tucker
*Assistant Examiner* — Brian R Slawski
(74) *Attorney, Agent, or Firm* — American Honda Motor Co., Inc.; William R. Fisher

(57) ABSTRACT

A multi-material joint and a method of making thereof. The multi-material joint includes a first member comprising a first metal or metal alloy that is secured to a second member comprising a second metal or metal alloy that is different than the first metal or metal alloy. A sealant is positioned between the first member and the second member that galvanically insulates the first member from the second member. The sealant comprises a liquid elastomer and a foaming agent.

14 Claims, 21 Drawing Sheets

(51) Int. Cl.

| | |
|---|---|
| *B32B 15/01* | (2006.01) |
| *C25D 7/00* | (2006.01) |
| *B29C 44/18* | (2006.01) |
| *B29C 65/00* | (2006.01) |
| *B29C 65/48* | (2006.01) |
| *B29C 65/60* | (2006.01) |
| *B32B 15/04* | (2006.01) |
| *B32B 15/06* | (2006.01) |
| *B32B 15/18* | (2006.01) |
| *B29C 65/56* | (2006.01) |
| *B32B 15/20* | (2006.01) |
| *B32B 15/092* | (2006.01) |
| *B29C 65/72* | (2006.01) |

(52) U.S. Cl.
CPC ........ *B29C 65/4835* (2013.01); *B29C 65/562* (2013.01); *B29C 65/601* (2013.01); *B29C 65/72* (2013.01); *B29C 66/712* (2013.01); *B29C 66/7314* (2013.01); *B29C 66/7422* (2013.01); *B29C 66/74283* (2013.01); *B32B 15/046* (2013.01); *B32B 15/06* (2013.01); *B32B 15/092* (2013.01); *B32B 15/18* (2013.01); *B32B 15/20* (2013.01); *B32B 2255/06* (2013.01); *B32B 2255/26* (2013.01); *B32B 2305/022* (2013.01); *B32B 2307/714* (2013.01); *C25D 7/00* (2013.01)

(58) Field of Classification Search
CPC .............. B29C 66/712; B29C 66/7314; B29C 66/73143; B29C 66/742; B29C 66/7422; B29C 66/74283; C25D 7/00; C25D 13/16; C25D 13/22
USPC .... 156/60, 71, 77, 78, 79, 91, 92, 150, 151, 156/278, 280, 296, 307.1, 330, 338; 296/203.01, 203.02; 280/784; 427/373, 427/384, 386
See application file for complete search history.

(56) References Cited

U.S. PATENT DOCUMENTS

| | | | |
|---|---|---|---|
| 5,741,840 | A | 4/1998 | Lindquist et al. |
| 6,162,504 | A | 12/2000 | Hubert et al. |
| 6,422,571 | B1 | 7/2002 | Keeney et al. |
| 6,506,447 | B1 | 1/2003 | Hirsch et al. |
| 6,656,979 | B1 | 12/2003 | Kitano et al. |
| 7,703,805 | B2 | 4/2010 | Sasaki et al. |
| 7,886,487 | B2 | 2/2011 | Boutin |
| 7,902,298 | B2 | 3/2011 | Kohlstrung et al. |
| 7,960,474 | B2 | 6/2011 | Rappmann et al. |
| 8,777,300 | B2 | 7/2014 | Kim et al. |
| 9,233,719 | B2 | 1/2016 | Shibata et al. |
| 9,517,796 | B2 | 12/2016 | Balzer et al. |
| 9,616,937 | B2 | 4/2017 | Sasaki |
| 9,878,743 | B2 | 1/2018 | Maruyama et al. |
| 9,919,745 | B2 | 3/2018 | Caillard et al. |
| 2006/0135635 | A1* | 6/2006 | deVry ........................ C08J 9/30 521/142 |
| 2010/0289242 | A1* | 11/2010 | Nitsche ................ B62D 27/026 280/124.155 |
| 2014/0308069 | A1* | 10/2014 | Boettcher ............... B32B 15/18 403/270 |
| 2015/0231859 | A1* | 8/2015 | Tatsumi ................... C23C 8/42 428/446 |
| 2015/0284607 | A1 | 10/2015 | Imamura |
| 2016/0244103 | A1* | 8/2016 | Amemiya ............. B62D 21/00 |
| 2017/0044408 | A1 | 2/2017 | Elgimiabi |
| 2017/0174264 | A1 | 6/2017 | Maruyama et al. |
| 2018/0029643 | A1 | 2/2018 | Maruyama et al. |

FOREIGN PATENT DOCUMENTS

| | | | |
|---|---|---|---|
| CN | 103408808 A | 11/2013 | |
| CN | 105238312 A | 1/2016 | |
| DE | 102005043948 A | 4/2007 | |
| DE | 102013007349 A1 | 10/2014 | |
| FR | 2321582 A1 | 3/1977 | |
| KR | 20060111013 A | 10/2006 | |
| KR | 20120083728 A | 7/2012 | |
| WO | WO-2006128722 A1 * | 12/2006 | ............. C08L 63/00 |

* cited by examiner

MULTI-MATERIAL JOINT AND METHOD OF MAKING THEREOF

BACKGROUND

Sealants have been traditionally used on motor vehicles to reduce noise and block the passage of fluids through steel joints or gaps of steel components.

SUMMARY

The substitution of lightweight materials for steel used in motor vehicles is an attractive option for vehicle mass reduction. However, the remainder of the vehicle body structure may still be fabricated with a dissimilar material. The joining of dissimilar materials can be problematic and additional processes must be considered to inhibit galvanic corrosion.

Structural adhesives are used to produce load-bearing joints, which are typically defined as joints with lap (or tensile) shear strengths resulting from the structural adhesive of greater than 1 MPa and, often, greater than 10 MPa. In such load-bearing joints, the structural adhesive forms a film between the dissimilar materials. However, such structural adhesives have low flexibility and little elongation. Therefore, the structural adhesives become brittle and additional safeguards may be necessary to maintain the desired level of protection against environmental conditions such as the penetration of water and corrosion resulting therefrom. Accordingly, structural adhesives are not particularly well suited for use in multi-material joints where other fasteners, such as rivets, form the load-bearing joint.

According to an aspect of the present disclosure, a multi-material joint is provided that includes a first member comprising steel that is attached to a second member comprising a lightweight metal or metal alloy. A sealant is positioned between the first member and the second member that galvanically insulates the first member from the second member. The sealant comprises one or more liquid elastomers, one or more foaming agents, and optionally one or more epoxy resins. Optionally, the sealant has a post-cure volume that is 15-35% greater than a pre-cure volume of the sealant. Optionally, the post-cure sealant comprises a tensile shear strength of less than 1 MPa.

According to an aspect of the present disclosure, a method of making a multi-material joint is provided that includes applying a sealant to a first member comprising steel or a second member comprising a lightweight metal or metal alloy, attaching the first member to the second member with the sealant positioned therebetween to galvanically insulate the first member from the second member, and curing the sealant. The sealant comprises one or more liquid elastomers, one or more foaming agents, and optionally one or more epoxy resins. Optionally, the sealant has a post-cure volume that is 15-35% greater than a pre-cure volume of the sealant. Optionally, the post-cure sealant comprises a tensile shear strength of less than 1 MPa.

According to an aspect of the present disclosure, a method of making a multi-material joint is provided that includes applying a sealant to a first member comprising a first metal or metal alloy or a second member comprising a second metal or metal alloy that is different than the first metal or metal alloy, attaching the first member to the second member with the sealant positioned therebetween to form the multi-material joint, and curing the sealant. The sealant galvanically insulates the first member from the second member and comprises one or more liquid elastomers, and one or more foaming agents.

According to an aspect of the present disclosure, a method of making a multi-material joint is provided that includes providing a casting comprising aluminum or an aluminum alloy, applying a sealant to the casting, positioning a plurality of stamped steel components along a perimeter of the casting with the sealant positioned between each of the stamped steel components and the casting to galvanically insulate the stamped steel components from the casting, securing each of the stamped steel components to the casting with one or more fasteners that extends through the sealant to form the multi-material joint, and heating the multi-material joint to expand and cure the sealant. The sealant comprises an epoxy resin, one or more liquid elastomers, and one or more foaming agents.

According to an aspect of the present disclosure, a method of making a multi-material joint is provided that includes providing a first member comprising steel and a second member comprising an aluminum alloy casting, applying a sealant to the first member or the second member, attaching the first member to the second member with the sealant positioned therebetween to form a multi-material joint, and curing the sealant. The sealant comprises one or more liquid elastomers, and one or more foaming agents. The sealant galvanically insulates the first member from the second member. The post-cure volume of the sealant is from 15% to 35% greater than a pre-cure volume of the sealant and the post-cure compressive modulus of elasticity of the sealant is from 20% to 35%.

According to an aspect of the disclosure, a multi-material joint is provided that includes a first member comprising a first metal or metal alloy, and a second member comprising a second metal or metal alloy that is different from the first metal or metal alloy. The second member is secured to the first member. A sealant is positioned between the first member and the second member to galvanically insulate the first member from the second member. Prior to curing, the sealant comprises one or more liquid elastomers, and one or more foaming agents. Optionally, the sealant comprises a post-cure volume of from 15% to 35% greater than a pre-cure volume of the sealant. Optionally, the post-cure tensile shear strength of the sealant is less than 0.5 MPa. Optionally, the pre-cure sealant comprises from 0.1% to less than 10% epoxy resin by weight. Optionally, the post-cure elongation at break of the sealant is from 80% to 120%. Optionally, the post-cure compressive modulus of elasticity of the sealant is from 20% to 35%. Optionally, the sealant before curing comprises from 0.1% to 20% liquid elastomer by weight. Optionally, the second member includes an e-coating and the sealant is positioned on the e-coating of the second member. Optionally, the first member comprises steel and the second member comprises an aluminum alloy casting.

According to an aspect of the disclosure, a multi-material joint is provided that includes a casting comprising an aluminum alloy, and a plurality of stamped steel components positioned along a perimeter of the casting. Each of the plurality of stamped steel components is mechanically fastened to the casting. A sealant is positioned between the casting and each of the plurality of stamped steel components to galvanically insulate the stamped steel components from the casting. The sealant comprises an epoxy resin, one or more liquid elastomers and one or more foaming agents. Optionally, the casting comprises an e-coating and the sealant is positioned on the e-coating of the casting. Optionally, at least one of the plurality of stamped steel components is secured to a side rail of a vehicle front body structure. Optionally, the sealant has a post-cure volume that is 15-35% greater than a pre-cure volume and a tensile shear strength of less than 0.5 MPa. Optionally, the sealant has a post-cure elongation at break of from 80% to 120%, and a post-cure compressive modulus of elasticity of 20-35%. Optionally, the sealant prior to curing comprises a solid rubber. Optionally, the sealant prior to curing comprises 0.1% to less than 10% epoxy resin by weight, and 0.1% to 20% liquid elastomer by weight. Optionally, the multi-material joint is free of other sealants and structural adhesives.

According to an aspect of the disclosure, a multi-material joint is provided that includes an e-coated casting. The casting comprises an aluminum alloy. A sealant is positioned on the e-coated casting. The sealant comprises an epoxy resin, one or more liquid elastomers, and one or more foaming agents. A plurality of stamped steel components are positioned along the perimeter of the e-coated casting. The sealant is positioned between each of the stamped steel components and the e-coated casting to galvanically insulate the stamped steel components from the e-coated casting. Each of the stamped steel components is secured to the e-coated casting with at least one fastener that extends through the sealant.

DETAILED DESCRIPTION

Figure 1:
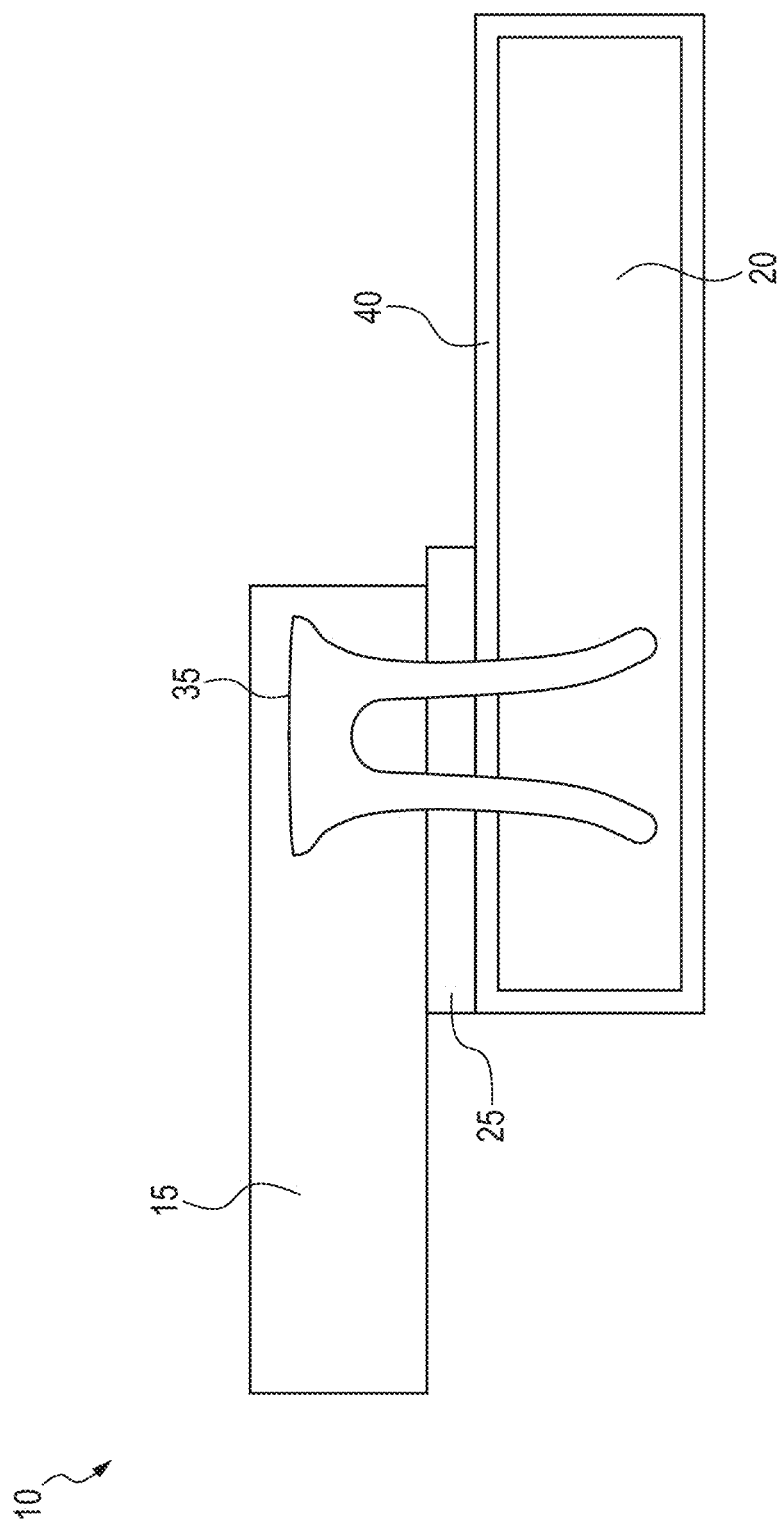
FIG. 1 is a schematic view of a multi-material joint including a first member, a second member, and a sealant prior to curing according to one aspect of the present disclosure.
Figure 2:
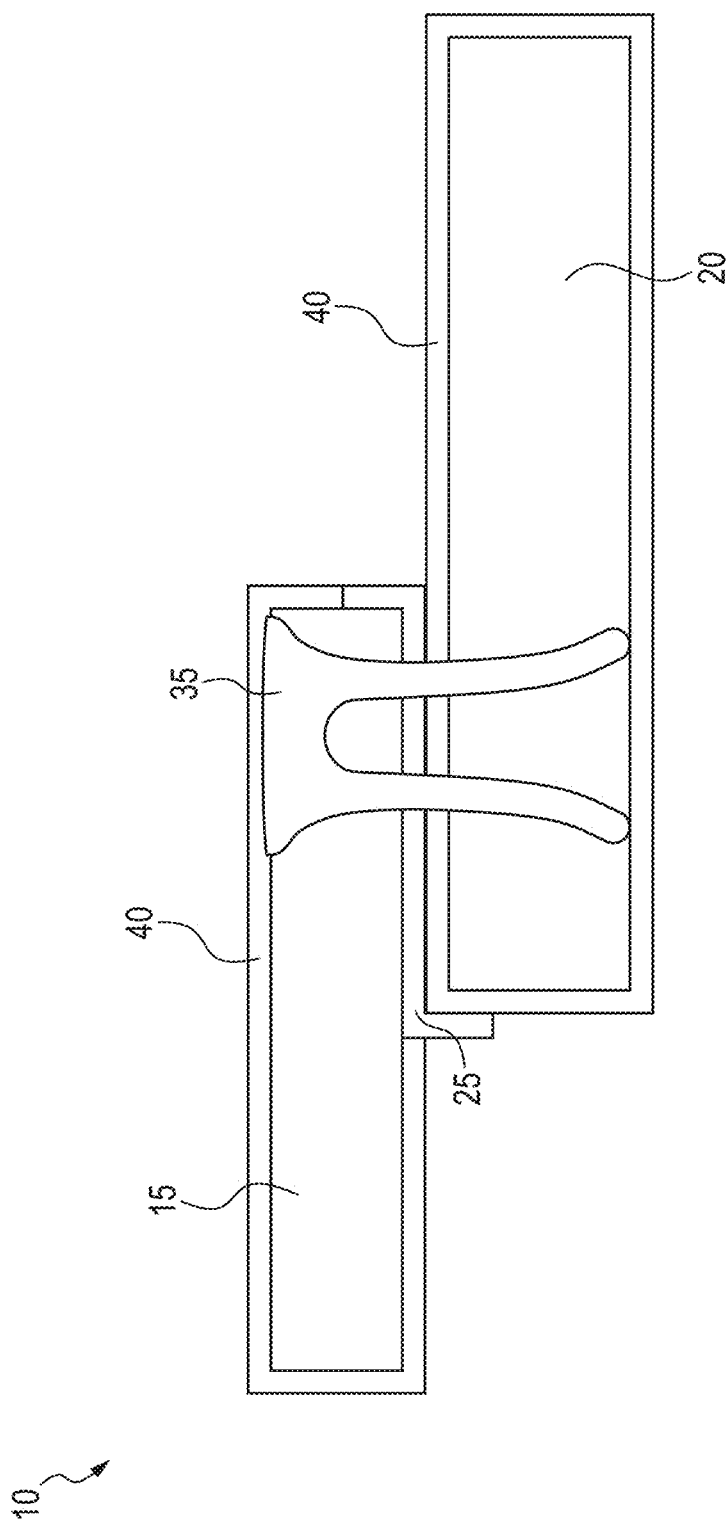
FIG. 2 is a schematic view of the multi-material joint of FIG. 1 with a protective coating applied to the joint, wherein the sealant has been cured and expanded.

In general, a multi-material joint and a method of making the multi-material joint are provided. In a non-limiting example as shown in FIG. 1, the multi-material joint 10 includes a first member 15 comprising a first metal or metal alloy, a second member 20 comprising a second metal or metal alloy that is different than the metal or metal alloy of the first member 15, and a sealant 25 positioned therebetween. The sealant 25 provides physical separation between the first member 15 and the second member 20 and functions as an insulator to facilitate isolation of the galvanic potential between the first member 15 and the second member 20. Thus, the first member 15 and the second member 20 can be isolated and insulated by the sealant 25 within the framework of the multi-material joint 10. The sealant 25 comprises one or more liquid elastomers, and one or more foaming agents that allows the sealant 25 to expand in volume when cured as shown in FIG. 2.

Figure 3:
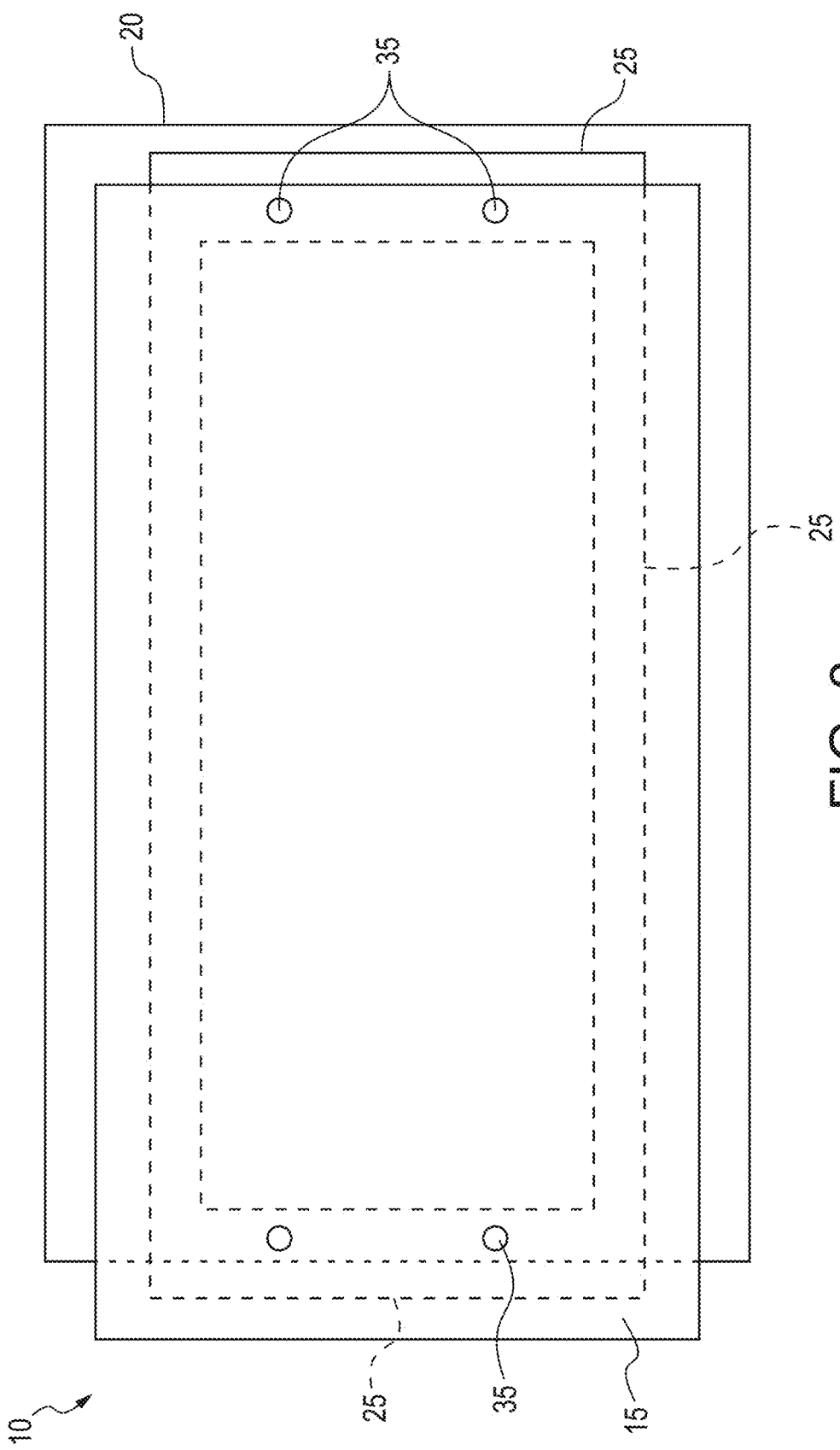
FIG. 3 is a schematic overhead view of a multi-material joint including a first member, a second member, and a sealant after curing and expansion according to one aspect of the present disclosure.

The sealant 25 as applied to the first member 15 and the second member 20 is not limited to any specific configuration or method of application. As shown in FIG. 3, the sealant 25 may be provided as a bead about a perimeter of the first member 15 and/or the second member 20. The bead of the sealant 25 may be continuous or discontinuous (not shown). One or more fasteners 35 are applied through the first member 15, the sealant 25, and into the second member 20 prior to curing of the sealant 25 to form the multi-material joint 10. The sealant 25 may be applied to extend outwardly beyond any one or more of the sides or ends of the first member 15 and the second member 20.

The fastener 35 is not limited, and may comprise one or more rivets, screws, bolts, and any combination thereof. In a non-limiting example, the fastener(s) 35 is coated with a material for electrically insulating the first member 15 from the second member 20 prior to securing the first member 15 to the second member 20. Such corrosion inhibiting coatings can include, but are not limited to, zinc coatings and aluminum coatings. In an illustrative example, the material used to coat the fastener(s) 35 is one available from NOF Metal Coatings North America Inc., under the GEOMET® trademark, which is formulated with an aqueous base and includes zinc and aluminum flakes in an inorganic binder. Such a coating provides barrier protection in that the overlapping zinc and aluminum flakes provide a barrier between the fastener 35 (that is typically comprised of steel) and any potentially corrosive environment, and the zinc can also sacrificially corrode to protect the fastener 35. In another illustrative example, the coating may be a galvanneal coating. Assembly conditions may vary depending on the type of fastener 35 used. Accordingly, the type of coating and the extent of coating coverage on the fastener 35 may be tailored for the desired method of securing the first member 15 to the second member 20 with a particular type of fastener 35.

In an illustrative example, the first member 15 is steel and the second member 20 is a different grade of steel, or a lightweight metal or metal alloy including aluminum, an aluminum alloy, magnesium, or a magnesium alloy. Further, the first member 15 and the second member 20 may be in any form including, but not limited to, a sheet, a stamping, an extrusion, or a casting, and the first member 15 may be in a different form than the second member 20. In an illustrative example, the first member 15 is a steel stamping, and the second member 20 is an aluminum alloy casting. As casting surfaces tend to be rough, structural adhesives have difficulty coating uniformly on the peak to valley areas of the cast surface which detracts from galvanic corrosion protection when the casting is attached to a dissimilar material. Without being limited to any particular theory, the flexibility and softness of the sealant 25, due at least in part to the liquid elastomer and foaming agent, results in more uniform coverage of the peak to valley areas of the surface of the casting, thereby improving galvanic corrosion protection.

Optionally, as shown in FIG. 1, the second member 20 can be coated with a corrosion prevention layer 40 (hereinafter referred to referred to as "the coating 40") prior to application of the sealant 25 thereon. The coating 40 can be an epoxy-based coating. In one example, the coating 40 can be applied to the second member 20 by an electrodeposition coating process, also known as e-coating. In such example, e-coating can include any of a variety of suitable compositions and methods for e-coating, any of which can be used to apply the coating 40 to the second member 20. The sealant 25 may then be applied to the second member 20 and the one or more fasteners 35 is applied through the first member 15, the sealant 25, and into the e-coated second member 20.

Figure 4:
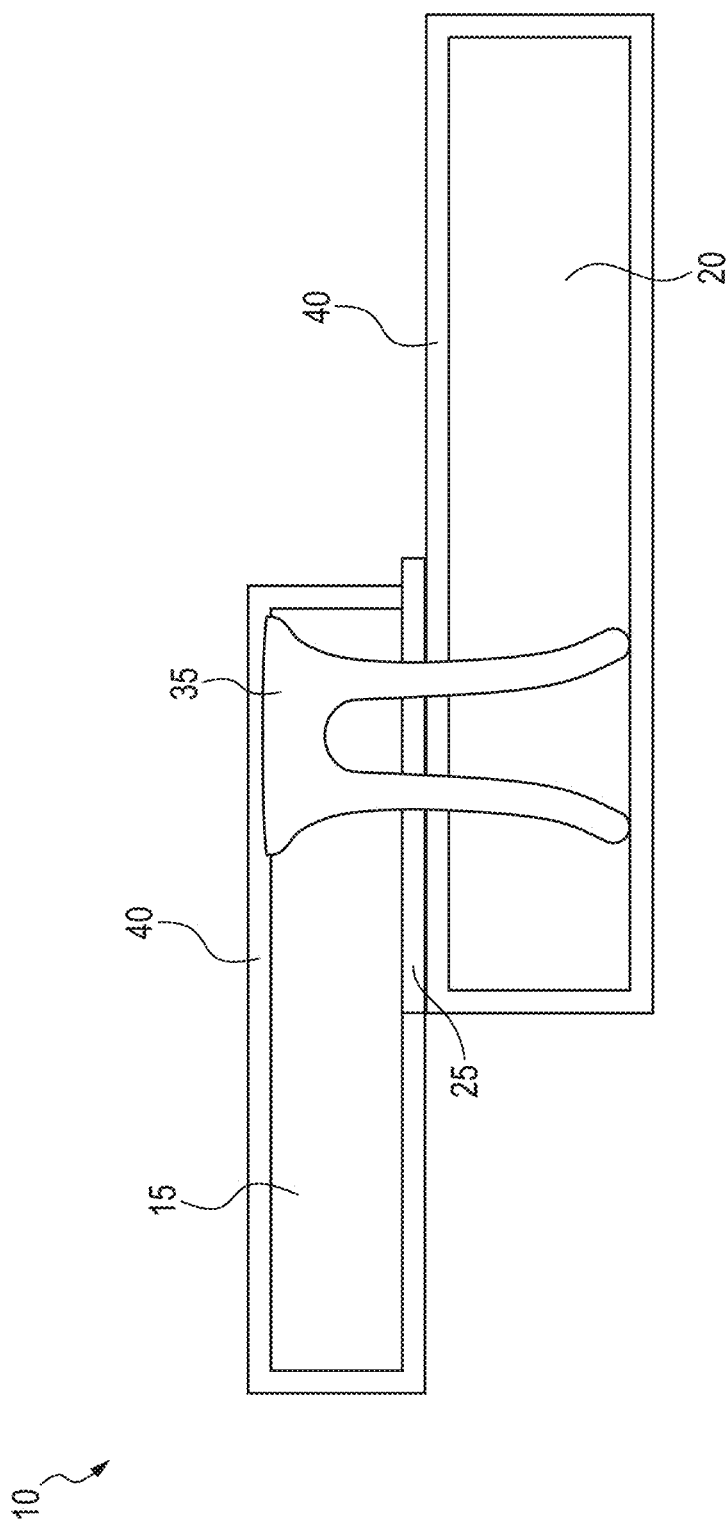
FIG. 4 is a schematic view of the joint of FIG. 2 before the sealant has been cured and expanded.

Prior to curing of the sealant 25, the multi-material joint 10 can be coated with a corrosion prevention layer that may be the same, or different, as the coating 40. As shown in FIG. 4, the corrosion prevention layer is the same as the coating 40. It is to be understood that the second member 20 may or may not include the coating 40 prior to the coating of the multi-material joint 10 with a corrosion prevention layer.

E-coating of the second member 20 and/or the multi-material joint 10 can be preceded by cleaning and/or treating the exposed surfaces of the first member 15 and/or the second member 20, which can provide sufficient phosphatability to facilitate proper coating formation. For example, a surface conditioner can be applied to the exposed surfaces of the first member 15 and/or the second member 20 to facilitate the coating of the first member 15 and/or the second member 20. Generally, e-coating can include submerging the second member 20 and/or the multi-material joint 10 into an electrodeposition bath in an e-coating tank, which can include, a binder resin, a synthetic resin, and optionally, a pigment and other additives dissolved or dispersed in a solvent. In an example, an epoxy resin can be used, along with any of a variety of other suitable resins.

Upon immersion into the e-coating tank, the second member 20 and/or the joint 10 can come into contact with electrodes such that a voltage can be applied between the cathode and an anode to provide current through the electrodeposition bath resulting in the application of the coating 40 on the second member 20 and/or the multi-material joint 10. In one example, the second member 20 and/or the multi-material joint 10 can undergo electrodeposition one or more times, and in some embodiments, second member 20 and/or the multi-material joint 10 can be washed between coatings, post-coating, or both. After the coating 40 is formed, the coating 40 can be cured by baking the multi-material joint 10 in an oven. In certain examples, the oven can be heated to about 150° C. or greater; in other examples, the oven can be heated to about 180° C. or greater; and in other examples, the oven can be heated to about 195° C. or greater. It is to be understood that the sealant 25 may be cured before or after application of the coating 40. In an illustrative example, the sealant 25 and the coating 40 are cured in the same oven step.

Although not shown, it is to be understood that the first member 15 and/or the second member 20 may be provided with one or more protective coatings in addition to the coating 40. In an illustrative example, the first member 15 may comprise a galvanized or galvannealed steel including a zinc or zinc alloy coating or a high strength steel including a zinc, zinc alloy, or AlSi coating.

In an embodiment, the sealant 25 is a one-component sealant that comprises one or more liquid elastomers, and one or more foaming agents. The foaming agent may be present in an amount sufficient to produce a post-cure volume that is 15-35% greater than a pre-cure volume of the sealant 25. Optionally, the post-cure sealant comprises a tensile shear strength of less than 1 MPa. Optionally, the post-cure sealant comprises a compressive modulus of elasticity of 20-35%. Optionally, the post-cure sealant comprises an elongation at break of 100%.

Illustrative examples of liquid elastomers include, but are not limited to, the following homo- and/or copolymers: polybutadienes including 1,4- 1,3- and 1,2-polybutadienes, polybutenes, polyisobutylenes, 1,4- and 3,4-polyisoprenes, styrene-butadiene copolymers, butadiene-acrylonitrile copolymers, and such one or more polymers may have terminal and/or (statistically distributed) lateral functional groups such as hydroxy, amino, carboxyl, carboxylic acid, carboxylic anhydride, or epoxy groups, polybutenes, polyisobutylenes, 1,4-polyisoprenes, 3,4-polyisoprenes, styrene-butadiene-copolymers, butadiene acrylonitrile copolymers, polyurethanes and polyepoxides. The molecular weight (MW) of the liquid elastomers may be below 80000, and optionally between 800 and 25,000. The amount of liquid elastomers in the composition depends upon the desired rheology of the uncured formulation and the desired mechanical properties of the cured sealant 25. In an illustrative example, the liquid elastomer may be present in an amount of up to 55 weight percent (wt %) of the total uncured sealant 25 composition. Optionally, the amount of liquid rubbers or elastomers may be up to 30 wt % of the uncured sealant 25 composition. Optionally, the amount of liquid rubbers or elastomers may be up to 15 wt % of the uncured sealant 25 composition. Optionally, the amount of liquid rubbers or elastomers is from 0.5 to 10 wt % of the uncured sealant 25 composition. Optionally, the uncured sealant 25 composition comprises from 1 to 5 wt % liquid rubbers or elastomers. "Liquid" is understood herein as "liquid at room temperature (22° C.)."

Optionally, one or more solid elastomers are included in the uncured sealant 25 composition. Solid rubbers usually have a significantly higher MW (100000 or higher) in comparison to liquid elastomers. "Molecular weight" is understood herein as "number average molecular weight (Mn)." Examples of solid rubbers include, but are not limited to, polybutadiene (preferably with high content of cis-1,4 double bonds), styrene butadiene rubber, butadiene acrylonitrile rubber, synthetic or natural isoprene rubber, polycyclooctenamer, butyl rubber, and polyurethane rubber. The proportion of solid elastomers can be up to 20 wt % of the uncured sealant 25 composition; optionally up to 15 wt % of the uncured sealant 25 composition, and optionally from 0.5 wt % to 9 wt % of the uncured sealant 25 composition. Optionally, the uncured sealant 25 composition comprises from 1 to 5 wt % solid elastomers.

It is to be understood that the amount of liquid elastomer and any optional solid elastomer in the uncured sealant 25 may be tailored to produce a desired set of properties for the sealant 25 composition (pre-cure or post-cure). In an illustrative example, the amount of liquid elastomer and any optional solid elastomer may be present in the uncured sealant 25 in an amount sufficient to provide the cured sealant 25 with a compressive modulus of elasticity as measured, in a non-limiting example, by ASTM D575-91 (2012) (Standard Test Methods for Rubber Properties in Compression) of 20-35%, and an elongation at break of 90-110% as measured, in a non-limiting example, by ASTM D412-16 (Standard Test Methods for Vulcanized Rubber and Thermoplastic Elastomers—Tension). The combined amount of liquid and solid elastomers can be up to 55 wt % of the uncured sealant 25 composition; optionally up to 30 wt % of the uncured sealant 25 composition, optionally up to 15 wt % of the uncured sealant 25 composition, and optionally from 0.5 wt % to 10 wt % of the uncured sealant 25 composition.

A vulcanizing system of sulfur and accelerators and/or, if applicable, quinone oximes may be included in the uncured sealant 25 composition. A plurality of vulcanizing agents in combination with elemental sulfur, but also vulcanizing systems without free sulfur, may be used. Illustrative examples include thiuram disulfides, organic peroxides, polyfunctional amines, quinones, p-benzoquinone dioxime, p-nitrosobenzene, and dinitrosobenzene, or also crosslinking with (blocked) diisocyanates. Vulcanizing systems based on elemental sulfur and organic vulcanization accelerators, as well as zinc compounds, are, however, very particularly preferred. Illustrative organic accelerators include dithiocarbamates (in the form of their ammonium or metal salts), xanthogenates, thiuram compounds (monosulfides and disulfides), thiazole compounds, aldehyde/amine accelerators (e.g. hexamethylenetetramine), and guanidine accelerators; dibenzothiazyl sulfide (MBTS), 2-mercaptobenzothiazole (MBT), the latter's zinc salt (ZMBT), zinc dibenzyl dithiocarbamate (ZBEC), N-cyclohexylbenzodithiazylsulfenamide (CBS), or diphenylguanidine. The accelerators may be used in quantities between 0.25 and 8.0 wt %, and optionally between 0.4 and 6 wt % of the uncured sealant 25. The vulcanizing mixture can also contain bifunctional crosslinkers. Illustrative examples include crosslinkers based on bifunctional dithiocarbamates such as, for example, 1,6-bis (N,N-dibenzylthiocarbamoyldithio)hexane. Crosslinkers of this kind may be contained in the compositions in quantities between 0 and 2 wt % of the uncured sealant 25, and optionally between 0 and 1 wt % of the uncured sealant 25. Illustrative examples of zinc compounds include zinc salts of fatty acids, zinc dithiocarbamates, basic zinc carbonates, and finely particulate zinc oxide. The zinc-compound content may be in the range between 0.5 and 10 wt %, optionally between 2 and 8 wt % of the uncured sealant 25. In addition, further typical rubber vulcanizing adjuvants such as fatty acids (e.g. stearic acid) can be present in the formulation.

The foaming agent may be any blowing agent capable of foaming during the curing process of the sealant 25. Illustrative examples include organic blowing agents from the class of the azo compounds, N-nitroso compounds, sulfonyl hydrazides, or sulfonyl semicarbazides. Examples of the azo compounds include, but are not limited to, azobisisobutyronitrile and in particular azodicarbonamide. Examples of the nitroso compounds include, but are not limited to, dinitrosopentamethylenetetramine. Examples of the sulfohydrazides include, but are not limited to, 4,4'-oxybis(benzenesulfonic acid hydrazide), di phenyl sulfone-3,3'-disulfohydrazide or benzene-1,3-disulfohydrazide. Examples of the semicarbazides include, but are not limited to, p-toluenesulfonyl semicarbazide. Without being limited to any particular theory, the amount of expansion of the sealant 25 during curing is determined by the expanding agent, but the ability of the expanding agent to expand may be terminated by the curing of the sealant 25, specifically when it reaches a point when the sealant 25 is too stiff due to crosslinkage to continue to expand. The one or more foaming agents may be present in an amount sufficient to produce a post-cure volume that is 15-35% greater than the pre-cure volume of the sealant 25; and optionally 15-29% greater than the pre-cure volume of the sealant 25. The amount of volume expansion of the sealant 25 may be measured by the water displacement method (for example, ASTM D792-13 Standard Test Methods for Density and Specific Gravity (Relative Density) of Plastics by Displacement) to compare the pre-cure and post-cure volumes of the sealant 25. In an illustrative example, the foaming agent is present in the sealant in an amount of 5 wt % or less of the uncured sealant 25, and optionally between 0.1 and 4 wt % of the uncured sealant 25.

In addition, the sealant 25 can contain fillers, accelerators, crosslinking agents such as sulfur and/or peroxides, antioxidants, co-activators and further catalysts, carbon blacks, oils, aging protection agents, fibers optionally including graphite, rheology adjuvants, adhesion promoters, pigments, and thermoplastic polymers.

Tackifiers and/or adhesion promoters (hereinafter referred to as "tackifier") may be included in the sealant 25. The type and amount of tackifier(s) included in the sealant 25 depends upon the polymer composition of the sealant 25, and the desired tensile strength of the cured sealant 25. Illustrative examples of tackifiers include hydrocarbon resins, phenolic resins, terpene phenolic resins, resorcinol resins or derivatives thereof, modified or unmodified resin acids and esters (abietic acid derivatives), polyamines, polyaminoamides, polyepoxy resins, anhydrides, and anhydride-containing copolymers. In an illustrative example, the tackifier is present in the uncured sealant 25 in an amount sufficient for the cured sealant 25 to have a tensile shear strength of less than 1 MPa, and optionally less than 0.5 MPa. The tensile shear strength of the cured sealant 25 composition when subjected to shear stress is measured, in a non-limiting example, by ASTM C961-15 (Standard Test Method for Lap Shear Strength of Sealants). Lap shear test measures the strength of sealant bond under conditions of constant shear and provides information regarding the adhesive bond to the substrates being tested. In a non-limiting example, the tackifier is provided in concentrations of up to 20 wt % of the uncured sealant 25, optionally up to 15 wt % of the uncured sealant 25, optionally from 0.1 to 10 wt % of the uncured sealant 25, optionally from 0.5 to 8 wt % of the uncured sealant 25, and optionally from optionally from 1 to 5 wt % of the uncured sealant 25.

Optionally, the sealant 25 comprises one or more plasticizers or extenders (hereinafter referred to as "plasticizer"). Illustrative examples include $C_4$- to $C_{14}$-dialkylesters of phthalic acid and $C_4$- to $C_{14}$-dialkylesters of $C_3$- to $C_8$-dicarboxylic acids, as exemplified by dioctyladipate, aliphatic, aromatic or naphthenic oils, low molecular weight polybutenes or polyisobutylenes, high boiling hydrocarbon fluids and mixtures thereof. The rheology of the uncured sealant 25 and the mechanical properties can be influenced to a certain extent by the amount of plasticizer and/or extender. In an illustrative example, the plasticizer is used in the range of 5 to 60 wt % of the uncured sealant 25, and optionally in the range of 30 to 60 wt % of the uncured sealant 25.

Optionally, the sealant 25 comprises one or more fillers. Fillers can be selected from a wide variety of materials including, but not limited to, chalk, calcium carbonate (natural ground or precipitated), calcium magnesium carbonates, calcium oxide, silicates, barite, carbon black, vermiculite, mica, talc or similar layered silicates. At least a portion of the fillers may be surface-pretreated. For example, calcium carbonates or chalks may be coated with stearic acid to decrease entrained moisture and decrease the moisture sensitivity of the cured sealant. In an illustrative example, the uncured sealant 25 includes up to 8 wt % calcium oxide, and optionally from 1 to 6 wt % calcium oxide. The total amount of fillers can vary from 10 to 80 wt % of the uncured sealant 25, optionally from 10 to 70 wt % of the uncured sealant 25, optionally from 20 to 65 wt % of the uncured sealant 25, and optionally from 20 to 60 wt % of the uncured sealant 25.

Illustrative examples of solid thermoplastic polymers that may be included in the uncured sealant 25 include polypropylene, polyethylene, thermoplastic polyurethanes, (meth) acrylate copolymers, styrene copolymers, polyvinyl chloride, polyvinyl acetal, polyvinyl acetate and copolymers thereof. Optionally, the thermoplastic polymers comprise particle powders with a glass transition temperature in the range between −80° C. and 50° C. Non-limiting average particle sizes of the thermoplastic polymer powder include less than 1 mm, optionally less than 350 and optionally between 100 and 20 Thermoplastic polymer powders may be provided in the uncured sealant 25 in an amount between 1 and 20 wt % of the uncured sealant 25, and optionally up to 15 wt % of the uncured sealant 25.

Stabilizers may be used for protection against thermal, thermooxidative or ozone degradation. Illustrative examples include sterically hindered phenols (for example, 2,2-methylene-bis(4-methyl-6-tert.-butylphenol)) or amine derivatives. The amount of stabilizer used may be in the range of 0.1 to 5 wt % of the uncured sealant 25.

Rheology improvers such as fumed silicas, bentonites, pyrogenic silicic acids, bentones, fibrillated or pulp short fiber, and hydrogentated castor oil derivatives can be present in the range of about 0.1 to 7 percent by weight. In addition, other conventional additives may be present in the formulations.

Figure 5:
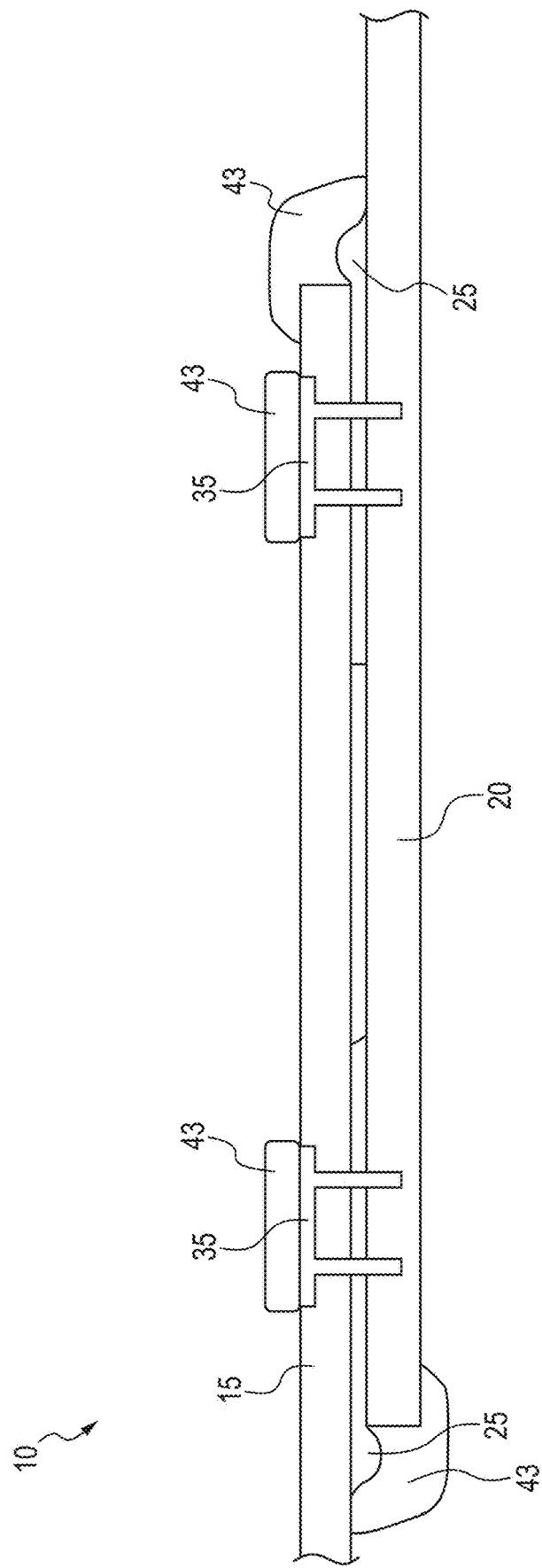
FIG. 5 is a schematic view of a multi-material joint including a body seam sealant applied about the outer periphery of the expanded and cured sealant of the present disclosure according to one aspect of the present disclosure.

In a non-limiting example as shown in FIG. 5, a conventional body seam sealant 43 (hereinafter referred to as "the seam sealant 43") may be applied to the multi-material joint 10 following expansion and curing of the sealant 25. The seam sealant 43 may be applied along all or part of the outer perimeter of the gap between the first member 15 and the second member 20, and the sealant 25 of the present disclosure, and optionally over the fasteners 35. The seam sealant 43 is applied to further inhibit water leakage and may comprise a composition that is hydrophobic. The seam sealant 43 may be cured, for example, in a paint cure oven. In a non-limiting example, the seam sealant 43 is a PVC plastisol based sealant that is designed to bond to the coating 40 of the multi-material joint 10. However, the multi-material joint 10 may include only the sealant 25 of the present disclosure without any additional sealants or structural adhesives, such as seam sealants 43, positioned between the first member 15 and the second member 20, or about the outer periphery of the first member 15, the second member 20, and the sealant 25 of the present disclosure.

Figure 6:
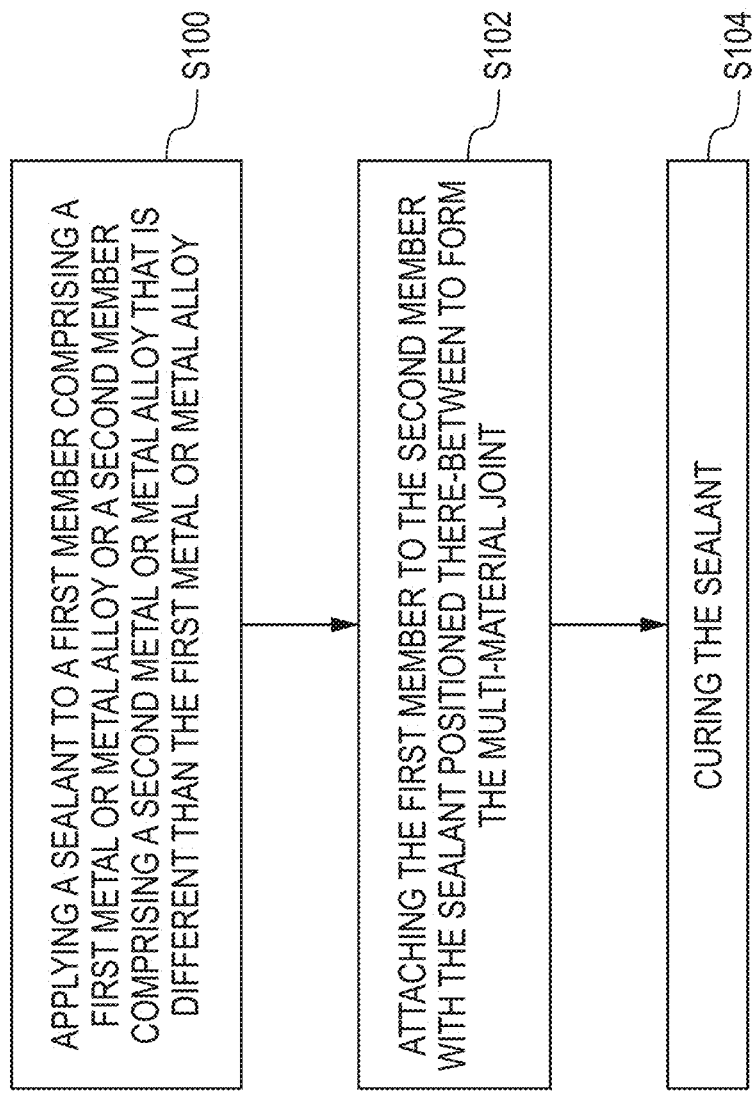
FIG. 6 is a schematic block diagram illustrating an exemplary method of making a multi-material joint according to one aspect of the present disclosure.

In an embodiment, a method of making the multi-material joint 10 is provided. As shown in FIG. 6, the method includes a step 100 of applying the sealant 25 to the first member 15 comprising a first metal or metal alloy or the second member 20 comprising a second metal or metal alloy that is different than the first metal or metal alloy. The sealant 25 includes one or more liquid elastomers, and one or more foaming agents. At step 102 the first member is attached to the second member with the sealant 25 positioned therebetween to form the multi-material joint 10. The sealant 25 galvanically insulates the first member 15 from the second member 20. At step 104, the sealant 25 is cured.

Figure 7:
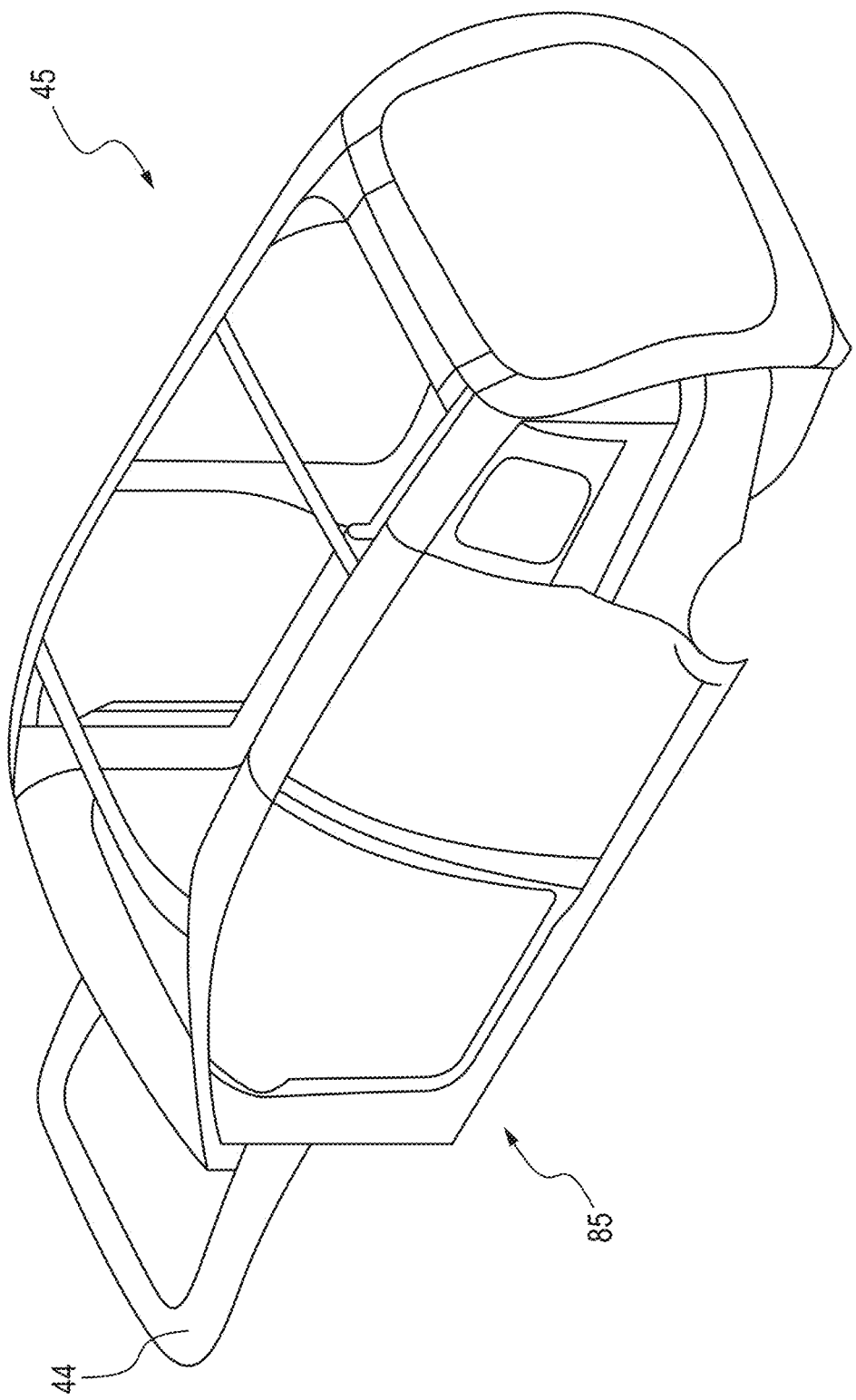
FIG. 7 is a perspective view of a portion of a vehicle including a front body structure.
Figure 8:
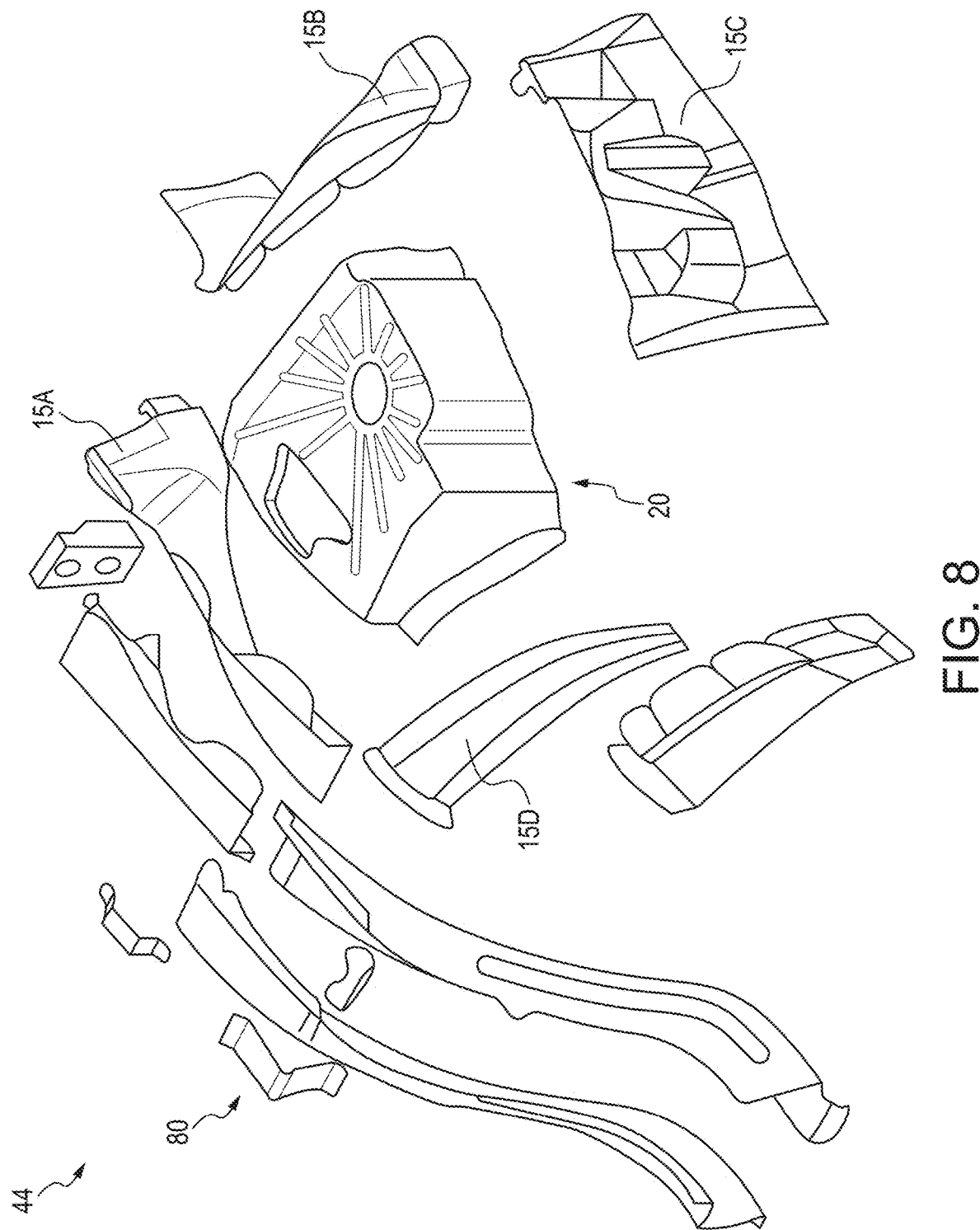
FIG. 8 is an exploded view of a first member, a second member, and a side rail of a front body structure according to one aspect of the present disclosure.
Figure 9:
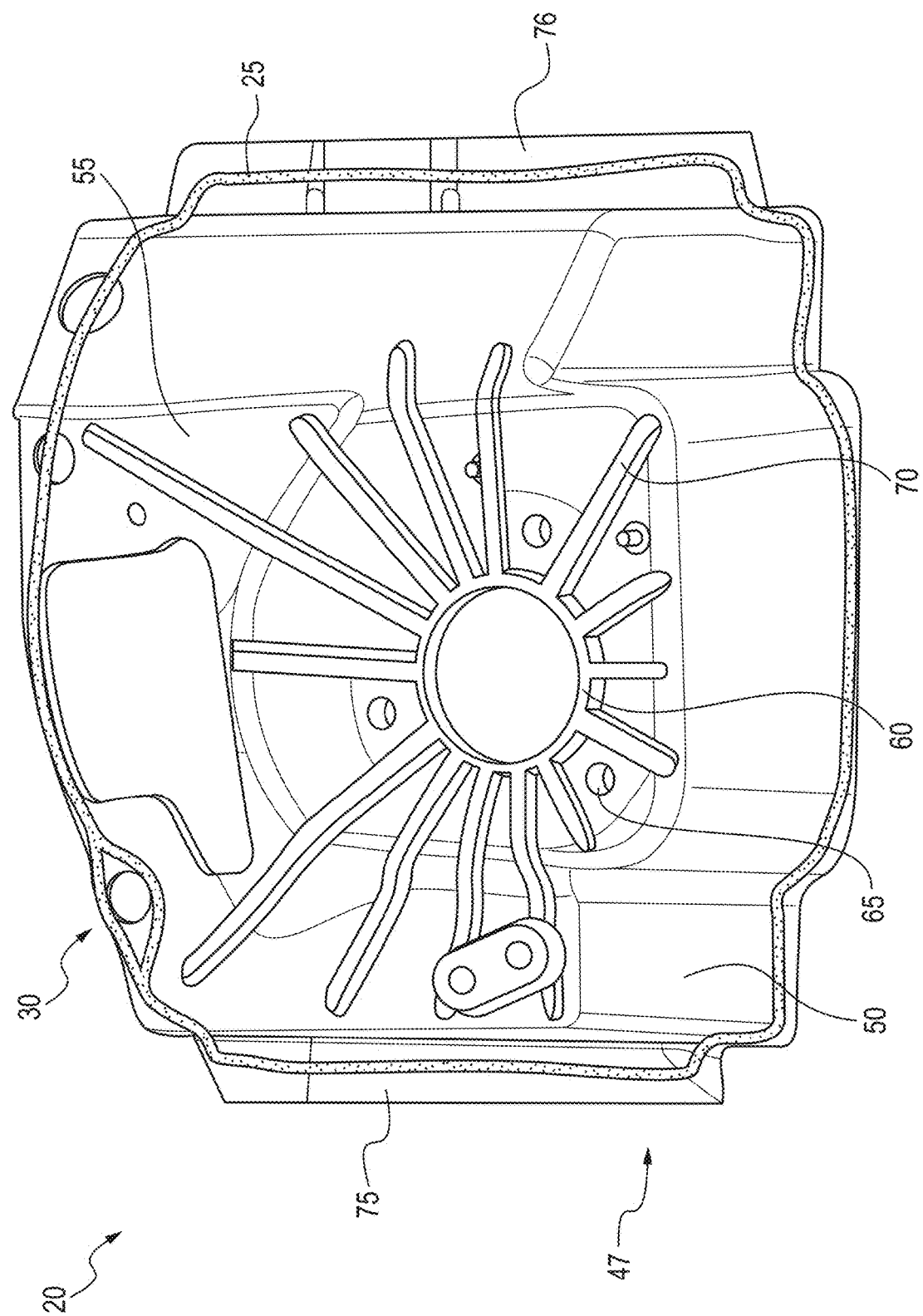
FIG. 9 is an overhead view of the second member of FIG. 8 with the sealant of the present disclosure applied in a bead along a perimeter thereof according to one aspect of the present disclosure.

In a non-limiting example, the multi-material joint 10 may form part of a component that is to be secured to a front body structure 44 of a vehicle 45 of as shown in FIG. 7. For example, as shown in FIG. 8, the first member 15 (or skirt) comprises a plurality of steel stamped components 15A, 15B, 15C and 15D, and the second member 20 is a damper housing (strut housing) comprised of an aluminum alloy casting that optionally has already been e-coated. As shown in FIG. 9, the damper housing 20 includes a base 47 with a sidewall 50 extending therefrom to an upper surface 55 that defines an aperture 60 and through holes 65 for passing threaded bolts to fasten an upper spring retainer (not shown) for a front suspension system (not shown) to the damper housing 20, and reinforcement ribs 70 extending outwardly from the circular opening 60. The base 47 includes feet 75 and 76 extending outwardly therefrom. The sealant 25 is applied to the damper housing 20 in a continuous bead along the perimeter 30 of the damper housing 20. As shown, the sealant 25 bead extends along the length of the feet 75, 76, along the length of a portion of the sidewall 50 extending between the feet 75, 76, and along the length of a portion of the upper surface 55 extending between the feet 75, 76.

Following application of the sealant 25 to the damper housing 20, the steel stamped components 15A, 15B, 15C, and 15D are positioned with respect to the damper housing 20 with the sealant 25 positioned therebetween to galvanically insulate the steel stamped components 15A, 15B, 15C, and 15D from the damper housing 20. In particular, the component 15A is positioned along the upper surface 55, the component 15B is positioned along the foot 76, the component 15C is positioned along the sidewall 50 adjacent the base 47, and the component 15D is positioned along the foot 75. The stamped components 15A, 15B, 15C, and 15D are secured to the damper housing 20 with rivets (not shown) applied through the stamped components 15A, 15B, 15C, and 15D along the sealant 25 bead extending along the perimeter 30. The rivets may extend through the sealant 25 and into the cast aluminum alloy damper housing 20 to form the multi-material joint 10.

Figure 10:
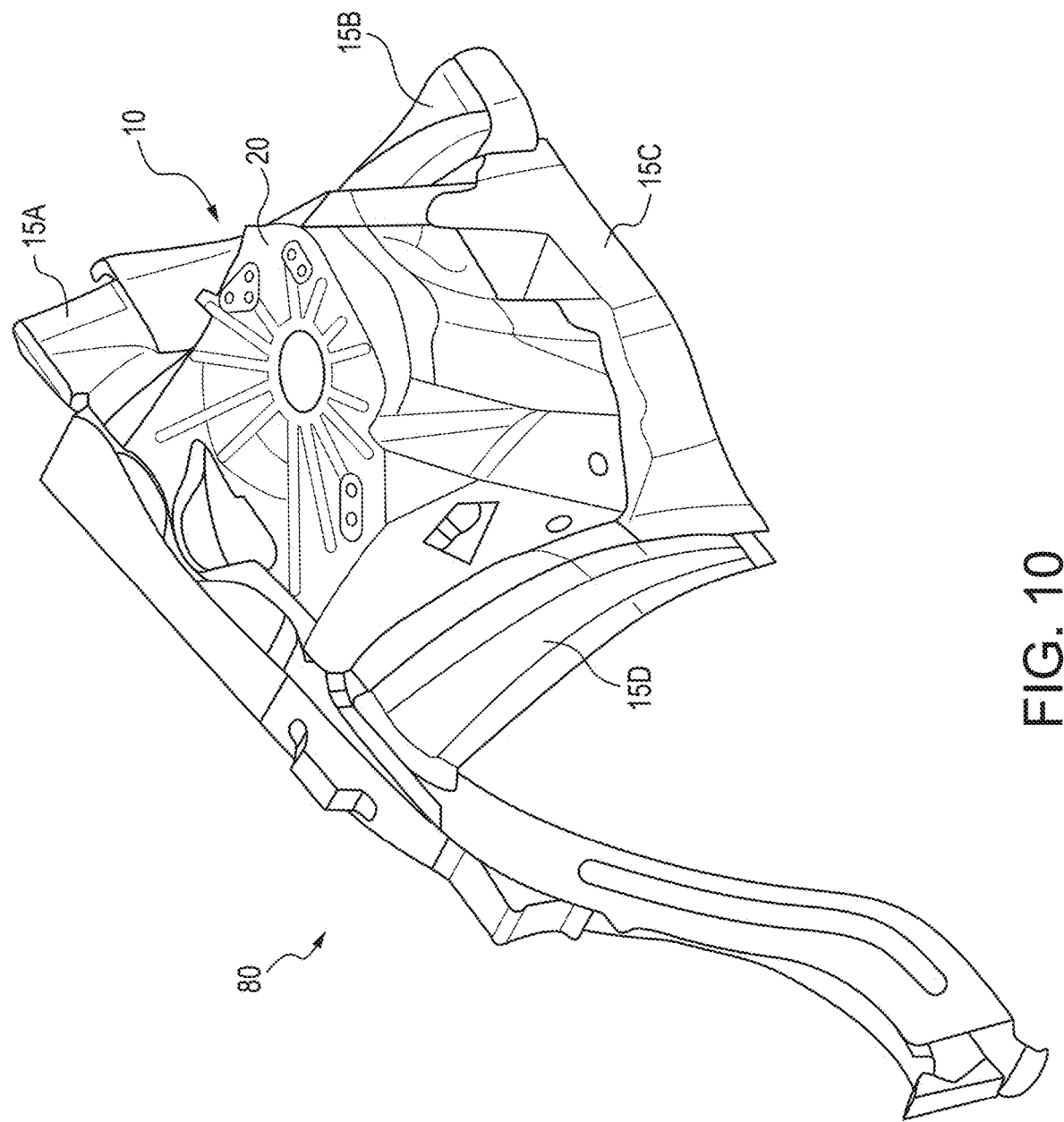
FIG. 10 is a perspective view of a component comprising a multi-material joint of the present disclosure secured to a side rail of a front body structure according to one aspect of the present disclosure.

The component 15A includes a projection extending outward therefrom that is securable to a side rail 80 of the front body structure 44 to mount the damper housing 20 thereto as shown in FIG. 10. The side rail 80 may be comprised of steel. Therefore, the component 15A can be secured to the side rail 80 by conventional joining methods, such as resistance spot welding.

Following the assembly of the multi-material joint 10 and securing of the multi-material joint 10 the side rail 80 of the front body structure 44, the primary body structure 85 of the vehicle is sent through an e-coating process to form the coating 40 on the primary body structure 85 and the multi-material joint 10 for additional corrosion protection. After the coating 40 is formed, the coating 40 is cured by baking the primary body structure 85 including the multi-material joint 10 in an oven heated to about 180° C. or greater. Heating of the multi-material joint 10 in the oven causes the foaming agent to expand the volume of the sealant 25, and allows for the sealant 25 and the coating 40 to be cured in the same oven step.

EXAMPLES

The exemplifying embodiments that follow are intended to explain the present disclosure further, the selection of examples not being intended to represent any limitation of the scope of the subject matter of the present disclosure.

The sealant of the present disclosure and a comparative structural adhesive were applied to test pieces and subjected to corrosion testing. The sealant of the present disclosure as applied to the test pieces comprised a liquid rubber present in an amount of less than 10% by weight of the sealant, an epoxy resin in an amount of less than 10% by weight of the sealant, and a foaming agent in an amount of less than 5% by weight of the sealant.

Figure 11:
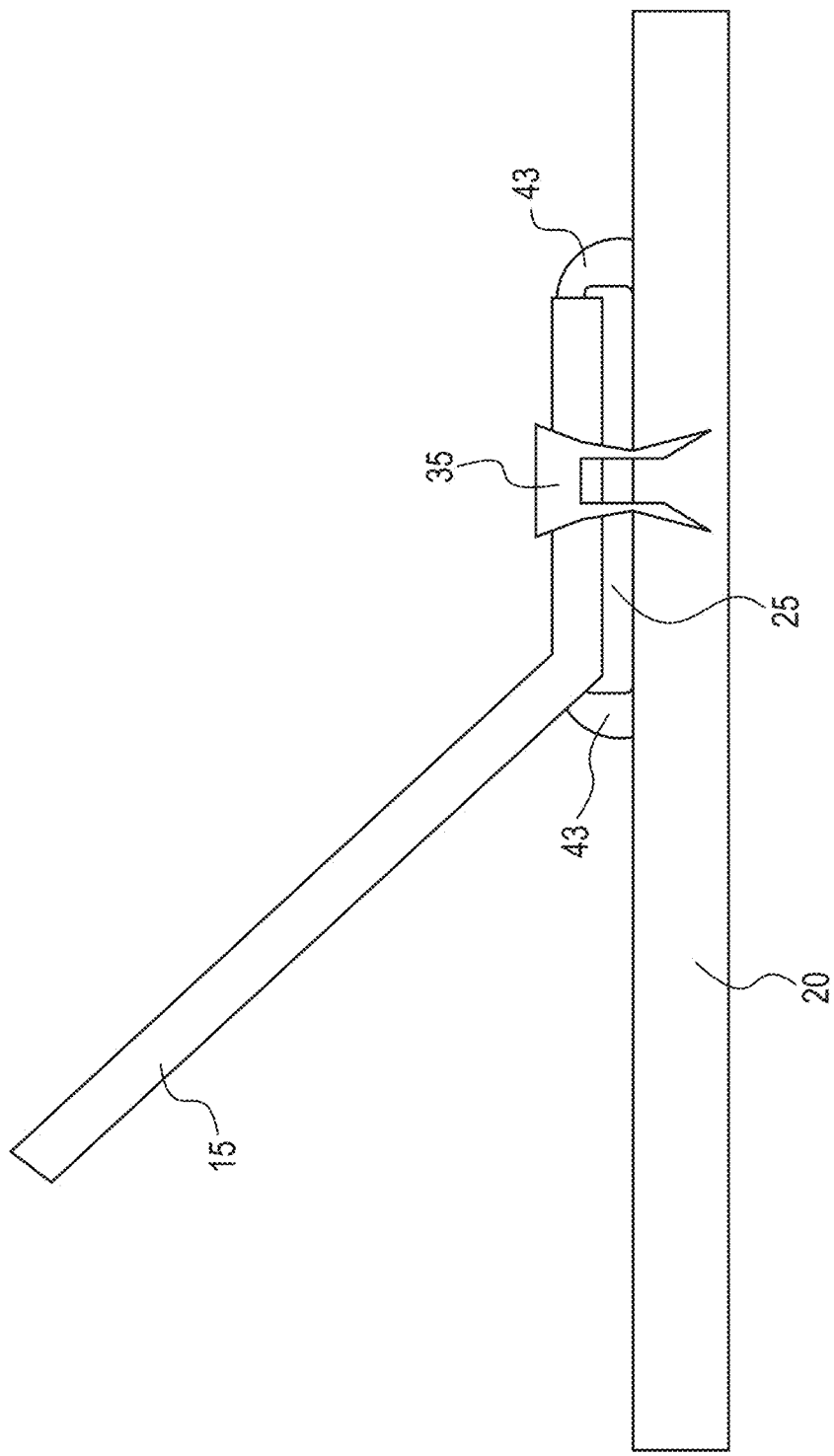
FIG. 11 is a schematic of a test piece construction of a multi-material joint for corrosion testing.

As shown in FIG. 11, the test piece construction included the first member 15 comprising a high strength steel coupon and the second member 20 comprising an aluminum coupon. In some examples, the aluminum coupon was e-coated with an epoxy-based coating. Samples were prepared with the sealant of the present disclosure or the comparative structural adhesive applied in the same manner between the aluminum and steel coupons. Some samples were also prepared without any of the sealant of the present disclosure or the comparative structural adhesive. Self-piercing rivets coated with a corrosion inhibiting coating were applied through the steel coupons and into the aluminum coupons to bond the steel coupons to the aluminum coupons. The assembled multi-material joints were then e-coated with an epoxy-based coating and baked in an oven at a temperature of 170° C. to 180° C. for about 30 minutes to cure the sealant of the present disclosure or the comparative structural adhesive.

For some of the samples, seam sealant 43 was applied (after curing the sealant of the present disclosure or the structural adhesive) along the outer edges of the gap between the steel coupon and the aluminum coupon in an attempt to inhibit the intrusion of moisture therebetween. The seam sealant 43 was a one component, PVC plastisol based sealant. The test samples including the seam sealant 43 were heated again in an oven to a temperature of 130° C. to 150° C. for 1 to 3 minutes.

The cured multi-material joints including the sealant of the present disclosure comprised a tensile shear strength of less than 0.5 MPa, and a post-cure volume that was 15-35% greater than the pre-cure volume.

The samples were subjected to corrosion testing in which the joints were subjected to spraying of a NaCl solution in a salt spray tester.

The results of corrosion testing are listed in TABLE 1 below:

TABLE 1

| Sample | Sealant of the Present Disclosure | Comparative Structural Adhesive | Body Seam Seal | Aluminum Coupon Includes E-Coat | Corrosion Performance |
| --- | --- | --- | --- | --- | --- |
| 1 | Yes | No | Yes | Yes | 0 |
| 2 | No | Yes | Yes | Yes | 3 |
| 3 | Yes | No | No | Yes | 0 |
| 4 | No | Yes | No | Yes | 5 |
| 5 | No | No | Yes | Yes | 4 |
| 6 | Yes | No | Yes | No | 2 |
| 7 | No | Yes | Yes | No | 6 |
| 8 | Yes | No | No | No | 1 |
| 9 | No | Yes | No | No | 6 |
| 10 | No | No | Yes | No | 8 |

Figure 12:
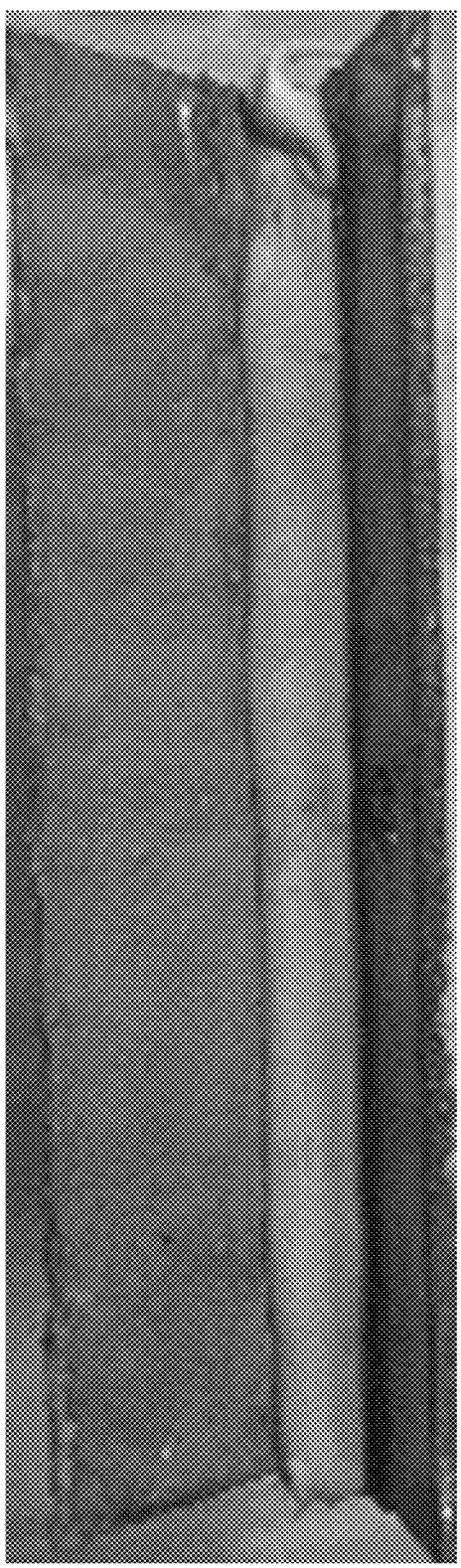
FIG. 12 is a view showing the results of a salt spray corrosion test of a multi-material joint in one aspect of the present disclosure including a steel panel riveted to an e-coated aluminum panel with the sealant of the present disclosure positioned therebetween and with a body seam sealant positioned about the periphery of the sealant of the present disclosure.
Figure 14:
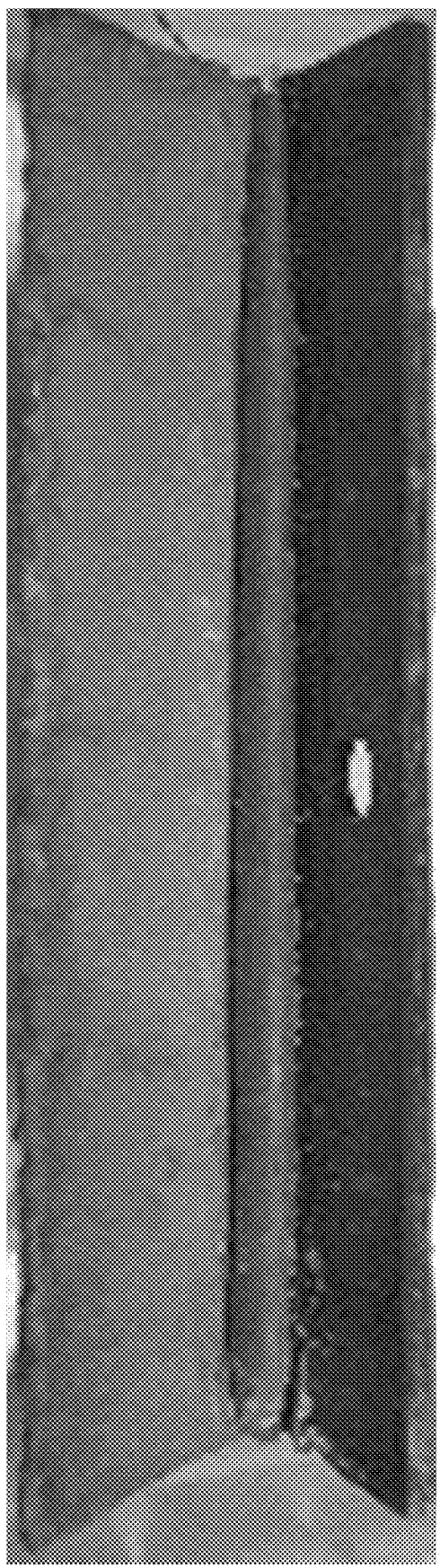
FIG. 14 is a view showing the results of a salt spray corrosion test of a multi-material joint in one aspect of the present disclosure including a steel panel riveted to an e-coated aluminum panel with the sealant of the present disclosure positioned therebetween, wherein the multi-material joint is free of a body seam sealant.
Figure 17:
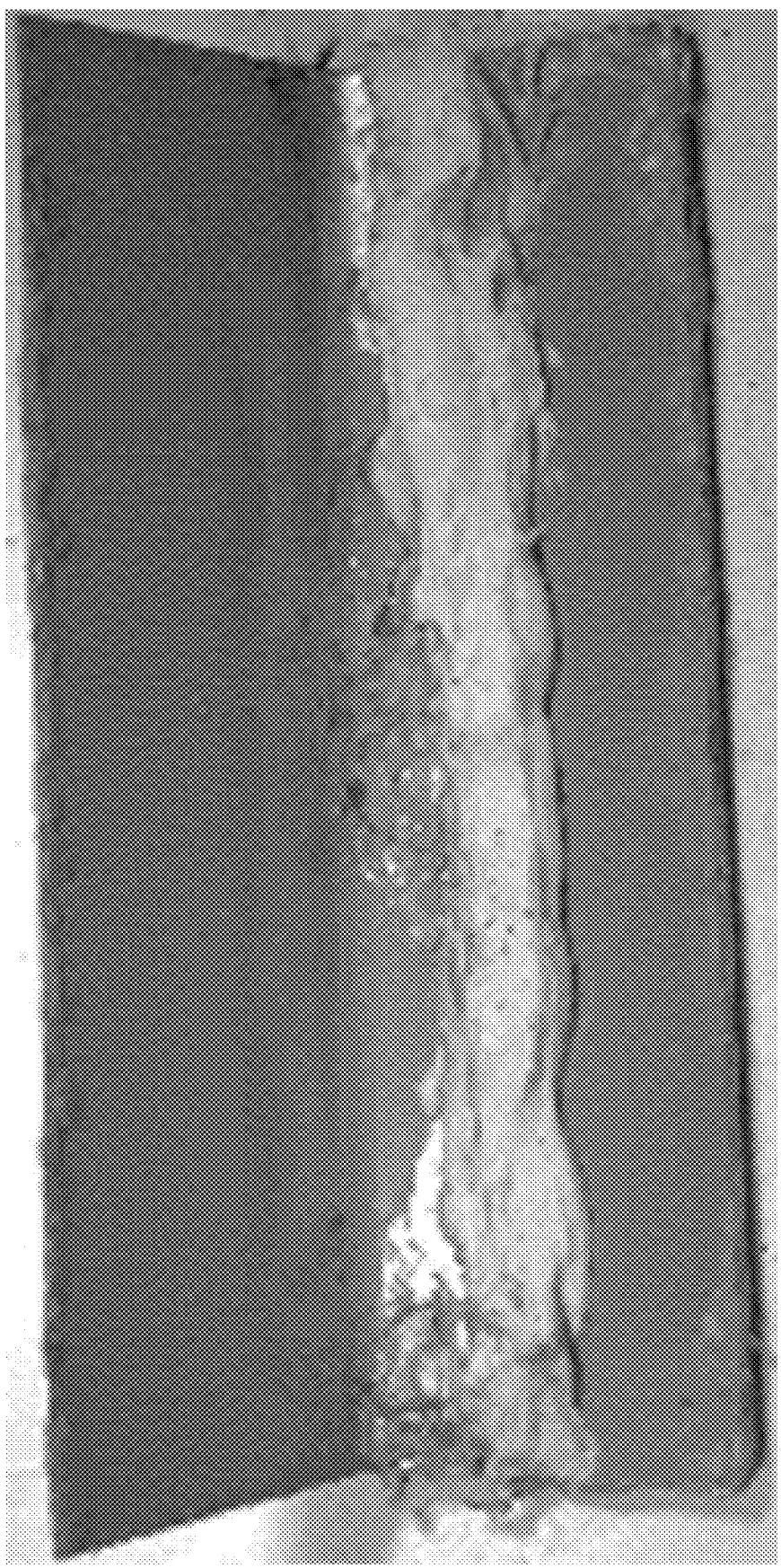
FIG. 17 is a view showing the results of a salt spray corrosion test of a multi-material joint in one aspect of the present disclosure including a steel panel riveted to an aluminum panel (free of an e-coating) with the sealant of the present disclosure positioned therebetween and with a body seam sealant positioned about the outer periphery of the sealant of the present disclosure.
Figure 19:
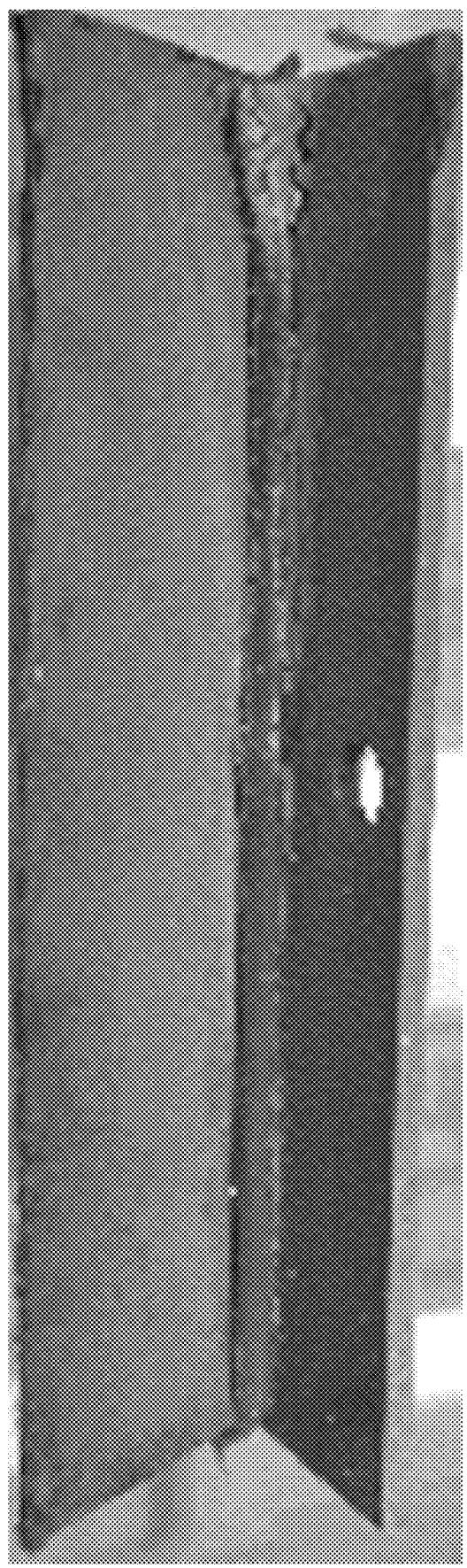
FIG. 19 is a view showing the results of a salt spray corrosion test of a multi-material joint in one aspect of the present disclosure including a steel panel riveted to an aluminum panel (free of an e-coating) with the sealant of the present disclosure positioned therebetween and without a body seam sealant.

The corrosion performance of each sample was graded with the lowest score possible (0) providing the best galvanic corrosion performance, and higher scores providing the worst galvanic corrosion performance. The sealant of the present disclosure (Sample 1 shown in FIG. 12, Sample 3 shown in FIG. 14, Sample 6 shown in FIG. 17, and Sample 8 shown in FIG. 19) outperformed the Comparative Structural Adhesive under every condition tested. It is noted that the sealant of the present disclosure provided superior corrosion performance even without the use of an additional seam sealant (Sample 3 as shown in FIG. 14). With respect to Samples 6 and 8, some galvanic corrosion did occur as shown in FIGS. 17 and 19. Without being limited to any particular theory, it is believed that the seam sealant composition applied to Sample 6 absorbed moisture that negatively impacted the corrosion performance of the aluminum coupon that was not e-coated prior to application of the sealant of the present disclosure. However, Samples 6 and 8 including the sealant of the present disclosure still maintained a higher degree of galvanic corrosion performance than any of the comparative structural adhesive samples.

Figure 13:
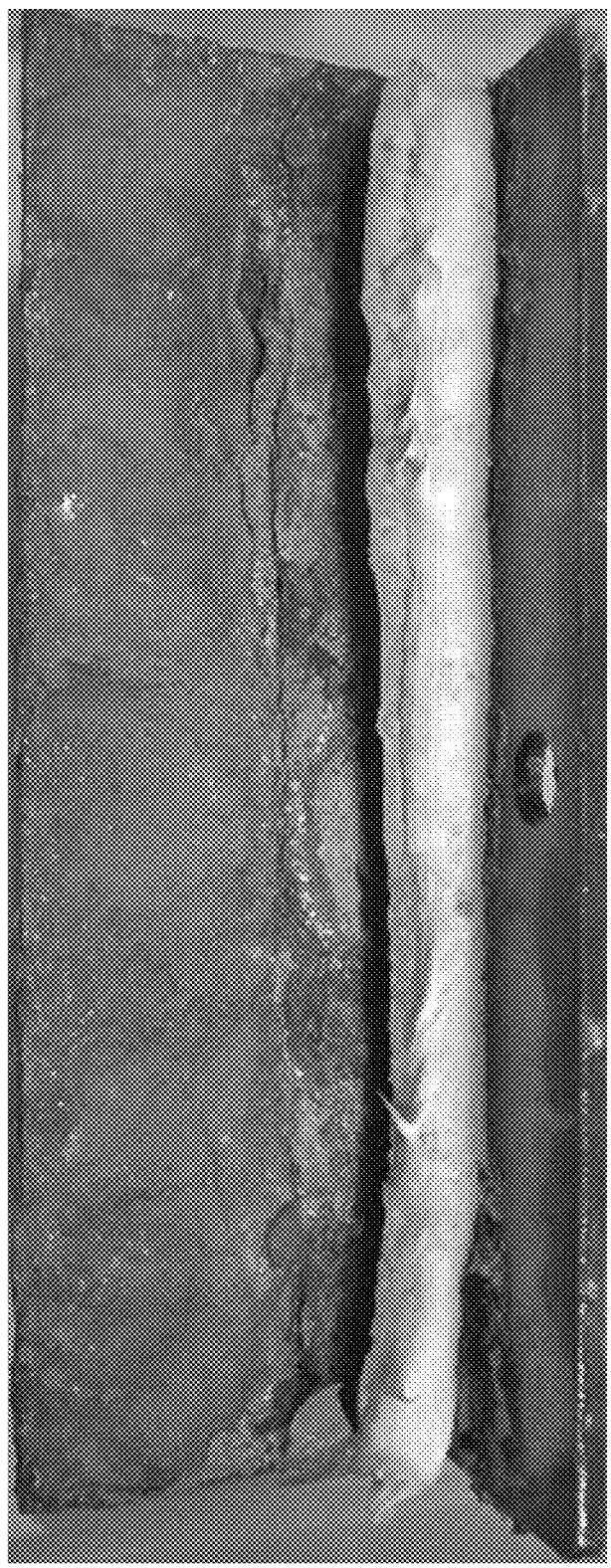
FIG. 13 is a view showing the results of a salt spray corrosion test of a comparative multi-material joint including a steel panel riveted to an e-coated aluminum panel with a comparative structural adhesive positioned therebetween and with a body seam sealant positioned about the outer periphery of the comparative structural adhesive.
Figure 15:
FIG. 15 is a view showing the results of a salt spray corrosion test of a comparative multi-material joint including a steel panel riveted to an e-coated aluminum panel with a comparative structural adhesive positioned therebetween, wherein the comparative multi-material joint is free of a body seam sealant.
Figure 18:
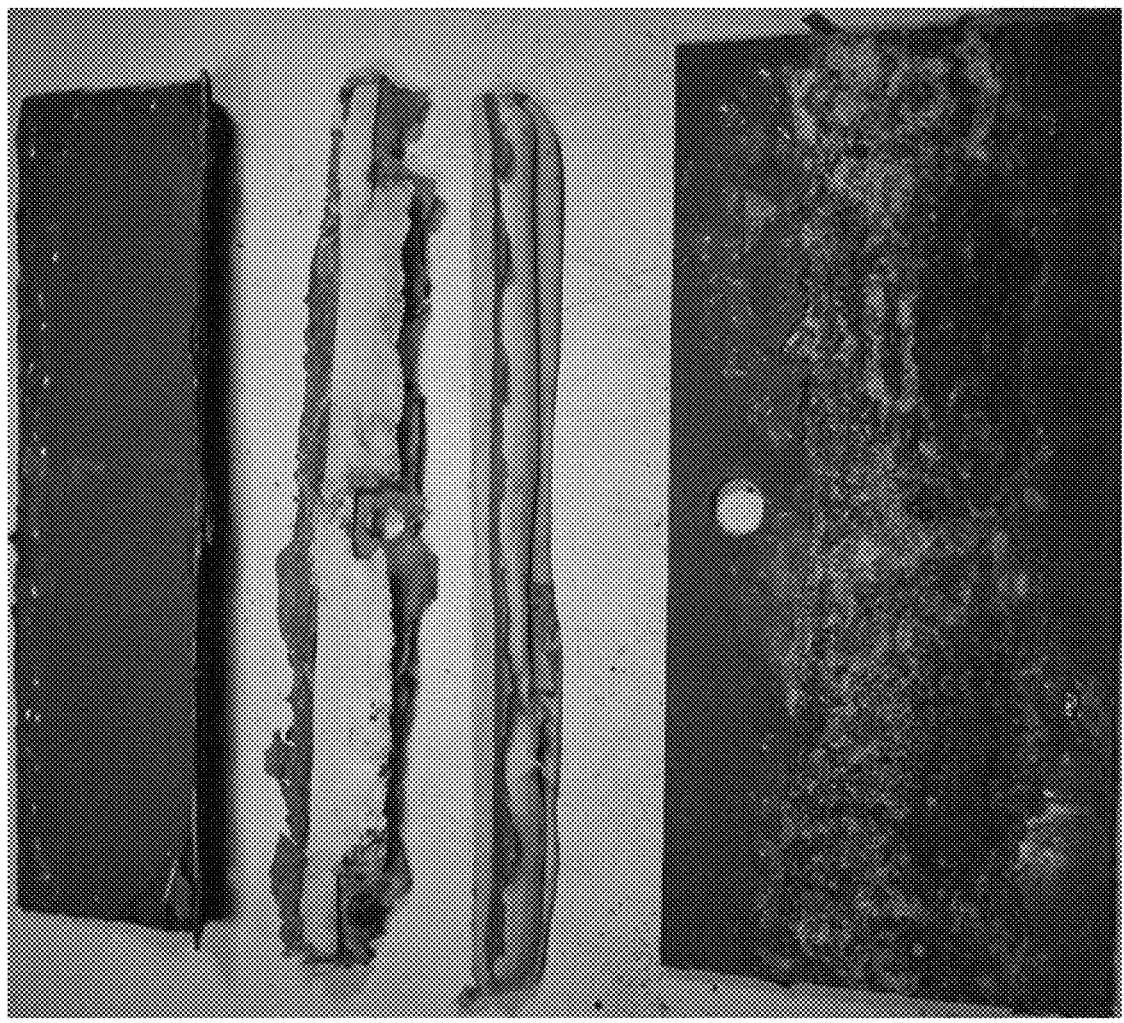
FIG. 18 is a view showing the results of a salt spray corrosion test of a comparative multi-material joint including a steel panel riveted to an aluminum panel (free of an e-coating) with a comparative structural adhesive positioned therebetween and with a body seam sealant positioned about the outer periphery of the comparative structural adhesive.
Figure 20:
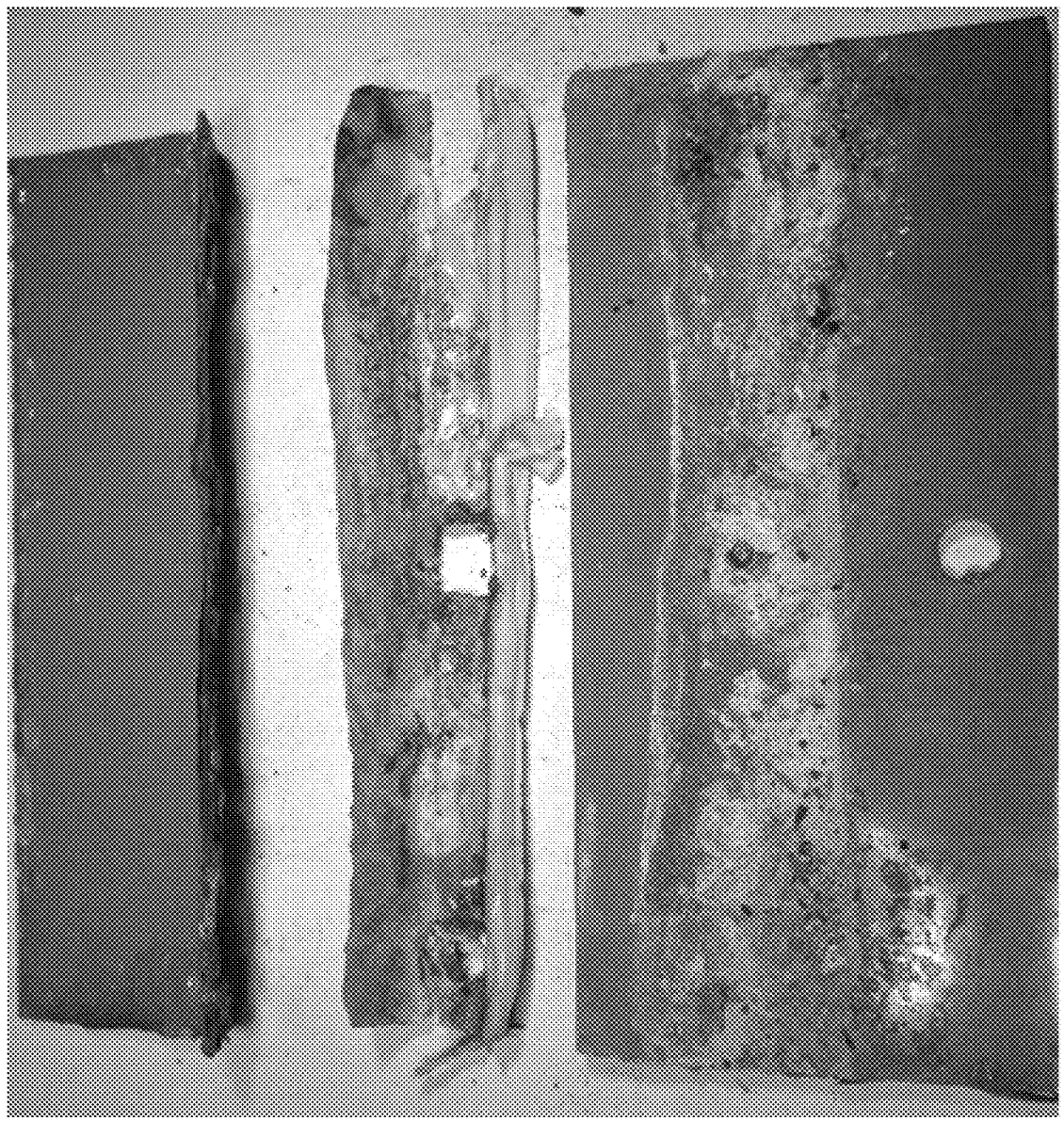
FIG. 20 is a view showing the results of a salt spray corrosion test of a comparative multi-material joint including a steel panel riveted to an aluminum panel (free of an e-coating) with a comparative structural adhesive positioned therebetween and without a body seam sealant.
Figure 21:
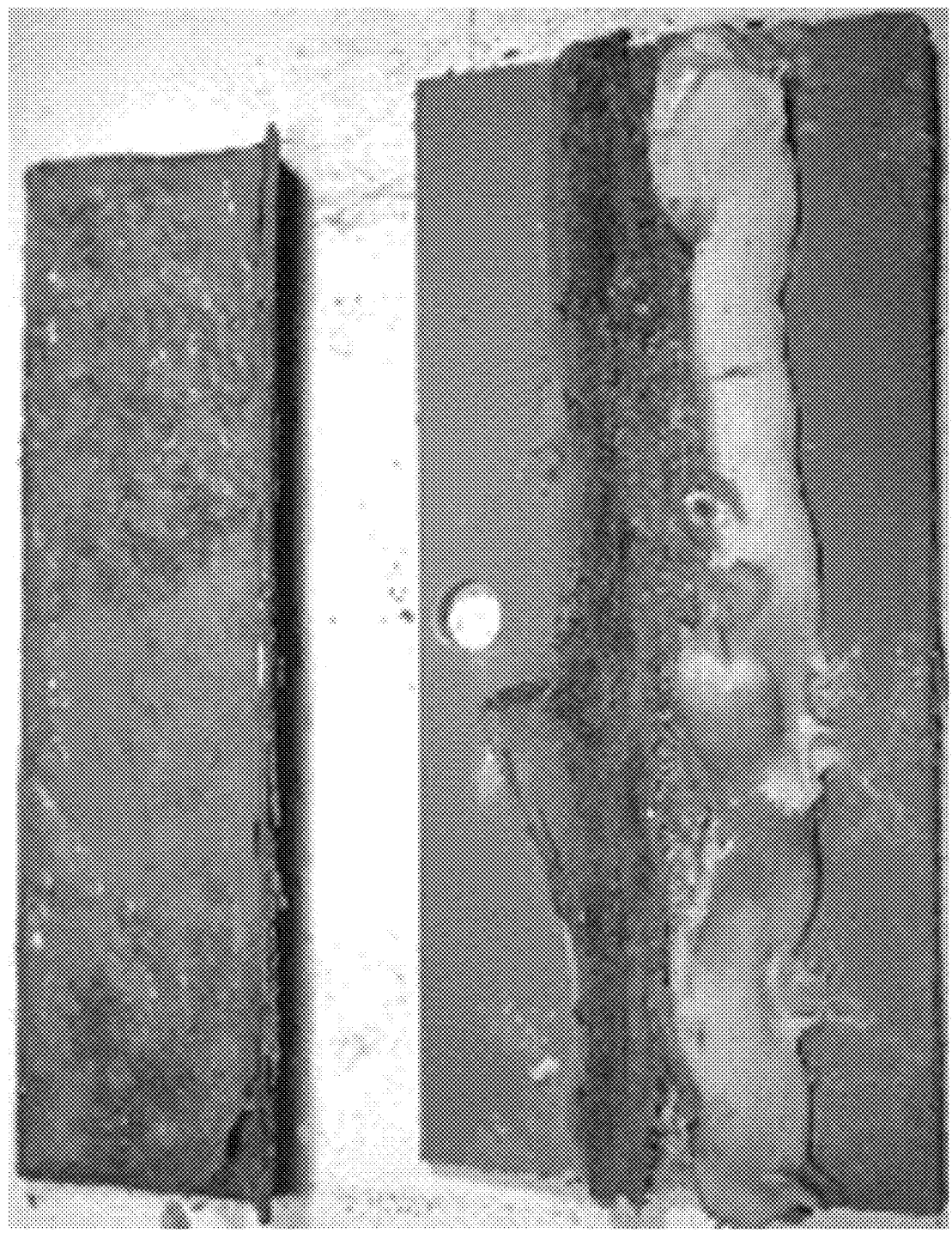
FIG. 21 is a view showing the results of a salt spray corrosion test of a comparative multi-material joint including a steel panel riveted to an aluminum panel (free of an e-coating), the joint including only a body seam sealant positioned about the outer periphery of a gap between the steel panel and the aluminum panel.

The comparative structural adhesive samples are shown in FIG. 13 (Sample 2), FIG. 15 (Sample 4), FIG. 18 (Sample 7), and FIG. 20 (Sample 9). As shown in FIGS. 13, 15, 18, and 20, Samples 2, 4, 7, and 9 each experienced severe galvanic corrosion that resulted in adhesive lifting and disintegration of the self-piercing rivet.

Figure 16:
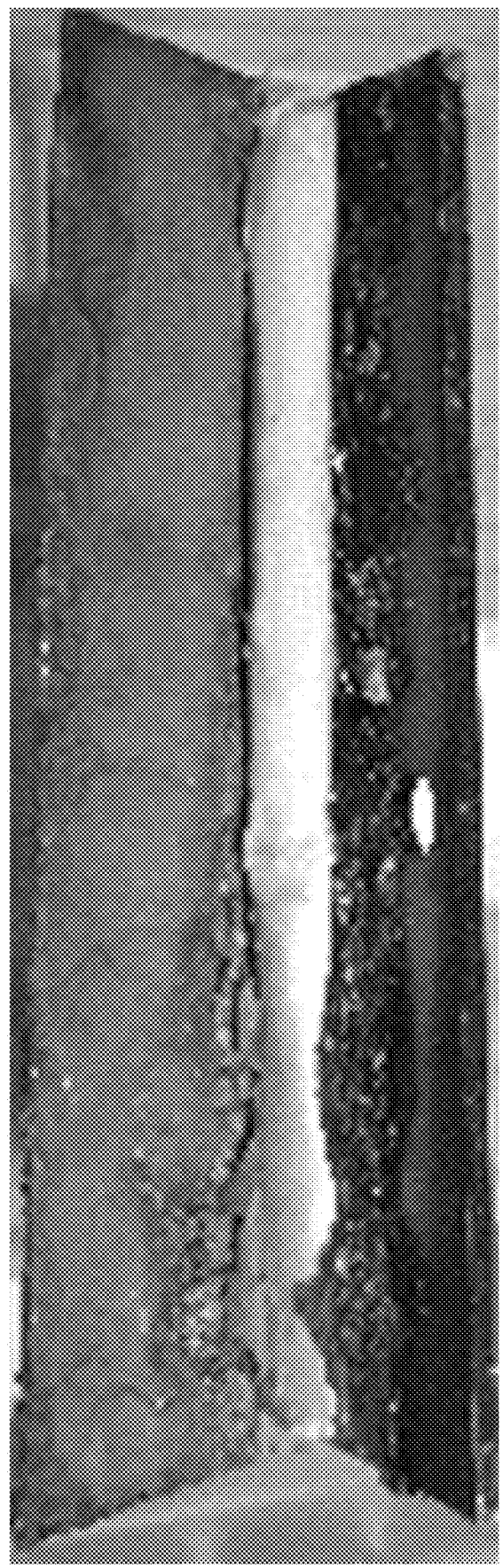
FIG. 16 is a view showing the results of a salt spray corrosion test of a comparative multi-material joint including a steel panel riveted to an e-coated aluminum panel, wherein the comparative multi-material joint includes only a body seam sealant positioned about the outer periphery of a gap between the steel panel and the aluminum panel.

Samples 5 and 10 included only the seam sealant positioned along the edges of the gap between the steel coupon and the aluminum coupon. Galvanic corrosion was present in both samples as shown in FIGS. 16 (Sample 5) and 21 (Sample 10). Sample 5 likely outperformed Sample 10 due to the inclusion of an additional e-coating step on the aluminum coupon. With respect to Sample 10, there was no lifting of the body seam sealant from the coupons, but the self-piercing rivet did disintegrate.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of making a multi-material joint comprising:
applying a sealant to a first member comprising steel or a second member comprising an aluminum alloy, the sealant comprising one or more liquid elastomers in an amount of from 0.1% to 20% by pre-cure weight of the sealant, from 0.1% to less than 10% epoxy resin by pre-cure weight of the sealant, and one or more foaming agents;
attaching the first member to the second member with the sealant positioned therebetween to form the multi-material joint, wherein the sealant galvanically insulates the first member from the second member; and
curing the sealant, wherein the post-cure elongation at break of the sealant is from 80% to 120%, and the post-cure tensile shear strength of the sealant is less than 0.5 MPa.

2. The method of claim 1, wherein a post-cure volume of the sealant is from 15% to 35% greater than a pre-cure volume of the sealant.

3. The method of claim 1, wherein the post-cure compressive modulus of elasticity of the sealant is from 20% to 35%.

4. The method of claim 1, further comprising:
e-coating the second member before the step of applying the sealant to the first member or the second member, wherein the step of applying the sealant to the first member or the second member includes applying the sealant to the second member; and
e-coating the multi-material joint before the step of curing the sealant, wherein the step of curing the sealant comprises heating the e-coated multi-material joint at a temperature of from 150° C. to 230° C. for a time period ranging from 5 minutes to 1 hour.

5. The method of claim 4, wherein the second member comprises an aluminum alloy casting.

6. A method of making a multi-material joint comprising:
providing a casting comprising an aluminum alloy;
applying a sealant to the casting, the sealant comprising an epoxy resin in an amount from 0.1% to less than 10% by pre-cure weight of the sealant, one or more liquid elastomers in an amount of from 0.1% to 20% by pre-cure weight of the sealant, and one or more foaming agents;
positioning a plurality of stamped steel components along a perimeter of the casting, wherein the sealant is positioned between each of the stamped steel components and the casting to galvanically insulate the stamped steel components from the casting;
attaching the casting to the plurality of stamped steel components with the sealant positioned therebetween to form the multi-material joint; and
heating the multi-material joint to expand and cure the sealant, wherein the sealant has a post-cure elongation at break of from 80% to 120% and a post-cure tensile shear strength of less than 0.5 MPa.

7. The method of claim 6, further comprising securing each of the stamped steel components to the casting with one or more fasteners that extends through the sealant to form the multi-material joint, and securing at least one of the stamped steel components of the multi-material joint to a side rail of a vehicle front body structure before heating the multi-material joint.

8. The method of claim 7, further comprising e-coating the casting before applying the sealant to the casting, and e-coating the vehicle front body structure after securing the at least one of the stamped steel components to the side rail and before heating the multi-material joint.

9. The method of claim 8, wherein the sealant has a post-cure volume that is 15-35% greater than a pre-cure volume of the sealant.

10. The method of claim 9, wherein the sealant has a post-cure compressive modulus of elasticity of 20-35%.

11. The method of claim 6, wherein the sealant prior to curing comprises a solid rubber.

12. The method of claim 6 wherein the multi-material joint is free of other sealants and structural adhesives.

13. A method of making a multi-material joint comprising:
providing a first member comprising steel and a second member comprising an aluminum alloy casting;
applying a sealant to the first member or the second member, the sealant comprising an epoxy resin in an amount from 0.1% to less than 10% by pre-cure weight of the sealant, one or more liquid elastomers in an amount of from 0.1% to 20% by pre-cure weight of the sealant, and one or more foaming agents;
attaching the first member to the second member with the sealant positioned therebetween to form the multi-material joint, wherein the sealant galvanically insulates the first member from the second member, wherein the sealant before curing comprises from 0.1% to 20% liquid elastomer by weight; and
curing the sealant, wherein a post cure tensile shear strength of the sealant is less than 0.5 MPa, a post cure volume of the sealant is from 15% to 35% greater than a pre-cure volume of the sealant and a post cure compressive modulus of elasticity of the sealant is from 20% to 35%.

14. The method of making a multi-material joint of claim 13, wherein the multi-material joint is free of other sealants and structural adhesives.

\* \* \* \* \*